(12) United States Patent
Akashi et al.

(10) Patent No.: US 6,268,092 B1
(45) Date of Patent: Jul. 31, 2001

(54) COLOR FILTER, DISPLAY ELEMENT, DISPLAY METHOD AND DISPLAY DEVICE

(75) Inventors: Ryojiro Akashi; Akinori Komura; Takashi Uematsu, all of Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/576,547

(22) Filed: May 24, 2000

(30) Foreign Application Priority Data

Jul. 19, 1999 (JP) .................................................. 11-204664

(51) Int. Cl.[7] .......................... G02B 5/20; G02F 1/1335; G02F 1/01; G02F 1/153

(52) U.S. Cl. ................ 430/7; 345/88; 345/105; 345/106; 359/891

(58) Field of Search ................ 430/7; 349/106; 345/32, 48, 50, 84, 88, 105, 106, 107; 359/886, 891

(56) References Cited

U.S. PATENT DOCUMENTS 5,739,946 * 4/1998 Iwanaga et al. ..................... 359/296

FOREIGN PATENT DOCUMENTS

| 196 30 560 | * | 1/1998 | (DE) . |
| 61-151625 | * | 7/1986 | (JP) . |
| 8-286215 | * | 11/1996 | (JP) . |
| 9-218422 | * | 8/1997 | (JP) . |
| 10-48675 | | 2/1998 | (JP) . |

* cited by examiner

*Primary Examiner*—John A. McPherson
(74) *Attorney, Agent, or Firm*—Oliff & Berridge, PLC

(57) ABSTRACT

A color filter having a substrate, (a 1st and 2nd) stimulus responsive high molecular gel particles each having a different color formed on the substrate, and a liquid in contact with the (1st and 2nd) stimulus responsive high molecular gel particles and a display element having the color filter and a dimming element dimming an incident light into the color filter. By imparting a stimulus or stopping the impart of the stimulus to the stimulus responsive high molecular gel particles to cause the state change of the high molecular gel particles, whereby the light transmittance can be improved.

22 Claims, 18 Drawing Sheets

COLOR FILTER, DISPLAY ELEMENT, DISPLAY METHOD AND DISPLAY DEVICE

FIELD OF THE INVENTION

The present invention relates to a color filter of utilizing a stimulus responsiveness of high molecular gels and a display element, etc., using the color filter, and also to a color filter and a display element widely applicable to a display portion of a display device such as desk top type or note type computers, etc., portable instruments, etc., to a display portion of other OA instruments, etc., and to a large area display plate, etc., for open-air.

BACKGROUND OF THE INVENTION

Hitherto, a liquid crystal display element has been widely utilized as a color display element. Furthermore, because a liquid crystal display element can be driven by a low consumed electric power, recently, the application thereof to a display portion such as portable instruments, etc., has been positively investigated. Now, a color liquid crystal display element is largely classified into two kinds of a transmission-type liquid crystal display element and a reflection-type liquid crystal display element.

The transmission-type liquid crystal element is generally constituted of a dimming layer formed by enclosing a TN (Twisted Nematic) liquid crystal, an STN (Super Twisted Nematic) liquid crystal, or a ferroelectricity liquid crystal, etc., between a pair of polarizers, and a color filter layer.

However, a general color filter has a low light transmittance (from about 20 to 30%) and as the result thereof, the light utilization efficiency of the liquid crystal display element becomes 10% or lower. Thus, to display images having a sufficient luminance, a back light of a high luminance, such as a cold cathode ray tube, EL, LED, etc., is usually disposed at the back side of the transmission-type liquid crystal display element. However, because a back light has a high consume electric power, when a back light is applied to a portable instrument such as a transmission-type liquid crystal display element, etc., there is a problem that the driving time by a battery becomes short. Also, when an environment is bright, such as out-of-door, the visibility thereof is lowered and further, because a polarizing plate is used, there is a problem that the angle of vision is narrow.

A reflection-type liquid crystal display element is a liquid crystal display element aiming at saving an electric power used, utilizing in out-of-door, and increasing a visibility as a hard copy, without using the above-described back light. As the reflection-type liquid crystal display element, according to the kind of a liquid crystal used, there are known an ECB (Electrically Control Birefringence) mode, GH (Guest Host) mode, a TN mole, an STN mode, etc. The reflection-type liquid crystal display elements of the TN mode and the STN mode have almost a similar construction to the above-described transmission-type liquid crystal element but are equipped with a light reflection electrode in place of a back light. However, because a color filter and a polarized plate are used as in the transmission-type liquid crystal display element, the reflectance is generally low as about 10% and the display becomes dark. Thus, by the improvement of the light-reflection electrode or the utilization of a microlens, the brightness of about 30% as reflectance is obtained at a specific narrow visual angle. However, there are problems that the brightness is yet insufficient, the angle of vision is extremely narrow, and the visibility is inferior.

The reflection-type liquid crystal display element of the ECB mode is a liquid crystal display element of carrying out a color display by an interference color using a polarizer, and in the reflection-type liquid crystal display element, a color filter is not required and the brightness of the displayed images can be improved to some extent as compared with the reflection-type liquid crystal display elements of the TN mode and the STN mode but the problem that the visibility is bad has not yet been solved.

In the reflection-type liquid crystal display element of the GH mode, because a liquid crystal having a mixture of dichromatic dyes (GH liquid crystal) is used, a polarizer and a color filter are unnecessary and a bright display having a broad angle of vision becomes possible. However, there are problems that the design of the liquid crystal materials for obtaining a necessary contrast is difficult, the durability of dyes is bad, and also a construction of three liquid crystal layers corresponding to the colors of C (cyan), M (magenta), and Y (yellow) becomes necessary for a full-color display, which results in greatly increasing the cost of the element.

For the purpose of improving the light utilization efficiency, which is considered to be a theme in the display technique of using a color filter, a technique of making changeable the amount of the transmitting light of color filter is proposed. For example, Japanese Patent Laid-Open No. 48675/1998 proposes a technique of laminating plural piezoelectric thin layers and changing the thickness of each layer by an external electric field, whereby the wavelengths of the reflected light and the transmitted light are changed by an interference action. However, in the technique, because an interference action is used, there are problems that a visual angle reliance occurs, the width of wavelengths is narrow, the quantity of light is small, etc.

SUMMARY OF THE INVENTION

The present invention has been made in view of the above-described circumstances and provides a color filter having a high utilization efficiency of light and a display element using the color filter. Also, the invention provides a color filter capable of changing the hue of the transmitted light. Furthermore, the invention provides a display element, a display method, and a display device capable of displaying bright images.

An aspect of the invention is a color filter having a substrate, 1st and 2nd stimulus responsive high molecular gels each having a different color formed on the substrate, and a liquid in contact with the 1st and 2nd stimulus responsive high molecular gels.

When a light strikes the above-described color filter, the light of definite wavelengths is absorbed by the 1st and/or 2nd stimulus responsive high molecular gels having a color, a transmitted light having various hues is obtained.

Further, when a light strikes the color filter in the state of improving the light transmittance by applying a stimulus to the $1^{st}$ and $2^{nd}$ stimulus responsive high molecular gels (intercepting the application of a stimulus) to change the state of the above-described high molecular gels, a bright transmitted light having various hues is obtained.

The above-described color filter may be a construction of having 1st colored regions having the 1st stimulus responsive high molecular gels and 2nd colored regions having the 2nd stimulus responsive high molecular gels. Also, it is preferred that each of the stimulus responsive high molecular gels is fixed to the surface of the substrate at each colored regions. Furthermore, it is preferred that as the 1st and 2nd stimulus responsive high molecular gels, high molecular gels each causes a volume change by absorbing or releasing a liquid when an external stimulus is applied. Also, it is preferred to employ a construction of having the stimulus responsive high molecular gels of three primary colors of R(red), G(green), and B(blue) because the images can be displayed in full color.

Also, the color filter may be a construction having a stimulus-imparting unit of imparting a stimulus to the 1st and 2nd stimulus responsive colored high molecular gels and also, it is preferred that the stimulus-imparting unit is constituted of a partitioned stimulus-imparting layers formed on the substrate.

An other aspect of the invention is a display element having the above-described color filter and a dimming element of dimming a incident light to the color filter.

In the above-described display element, an incident light to the color filter is dimmed by the dimming element and colors of various color tones are displayed. Because the color filter has a high light transmittance, in the display element of the invention, a bright display is possible.

In the display element of the invention, it is preferred that the above-described dimming element has a construction having a substrate, black stimulus responsive high molecular gels on the substrate and a liquid in contact with the stimulus responsive high molecular gels. The display element can be a construction having a stimulus-imparting unit of imparting a stimulus to the black stimulus responsive high molecular gels. Also, it is preferred that the stimulus-imparting unit is constituted of a partitioned stimulus-imparting layers formed on the substrate of the dimming element. Furthermore, the dimming element may be a liquid crystal dimming element.

Also the display element can be a construction having a light-irradiating unit of irradiating the dimming element with a light. Also, the display element can be a construction having a light reflecting unit of reflecting a light to the dimming element.

Still another aspect of the invention is a display element having a substrate, a 1st layer disposed at one surface side of the substrate, the 1st layer having colored stimulus responsive high molecular gels and a liquid in contact with the stimulus responsive high molecular gels, and a 2nd layer disposed at the other surface side of the substrate, the 2nd layer having black stimulus responsive high molecular gels and a liquid in contact with the black stimulus responsive high molecular gels, wherein the 1st layer has colored regions formed by disposing the above-described colored stimulus responsive high molecular gels at partitioned regions, and the 2nd layer has a dimming region formed by disposing the above-described black stimulus responsive high molecular gels at partitioned regions.

In the display element, by the dimming regions of the 2nd layer, an incident light to the colored regions of the 1st layer is dimmed and by absorbing a light of a definite wavelength in the colored regions, a colored image or a colorless image is displayed. Because by giving a stimulus to the stimulus responsive high molecular gels fixed to each of the dimming regions and the colored region, the light transmittance of each of the dimming regions and the colored region is changed, the display of various color tones (including luminance, and so forth in the specification) becomes possible.

An other aspect of the invention is a display device having the above-described display element, a unit of changing the light transmittance of the color filter according to an input image information, and a unit of changing the light transmittance of the dimming element according to the above-described image information.

Because the above-described display device is equipped with the above-described display element, an image enriched with color tones can be displayed.

Another aspect of the invention is a display method using a display element having a substrate, a 1st layer disposed at one surface side of the substrate, the 1st layer having colored stimulus responsive high molecular gels and a liquid in contact with the stimulus responsive high molecular gels, and a 2nd layer disposed at the other surface side of the substrate, the 2nd layer having black stimulus responsive high molecular gels and a liquid in contact with the black stimulus responsive high molecular gels, wherein by imparting a stimulus to the black stimulus responsive high molecular gels, the light transmittance of the 1st layer is changed and/or by imparting a stimulus to the colored stimulus responsive high molecular gels, the light transmittance of the 2nd layer is changed to change the color tone of the display color.

In the above-described display method, because the light transmittances of the 1st layer and the 2nd layer can be separately changed, the color tone of the displayed color can be variously changed by various combinations.

BRIEF DESCRIPTION OF THE DRAWINGS

Preferred embodiments of the present invention will be described based on the following figures, wherein.

DETAILED DESCRIPTION OF THE INVENTION

Then, the present invention is described in detail.

Figure 1:
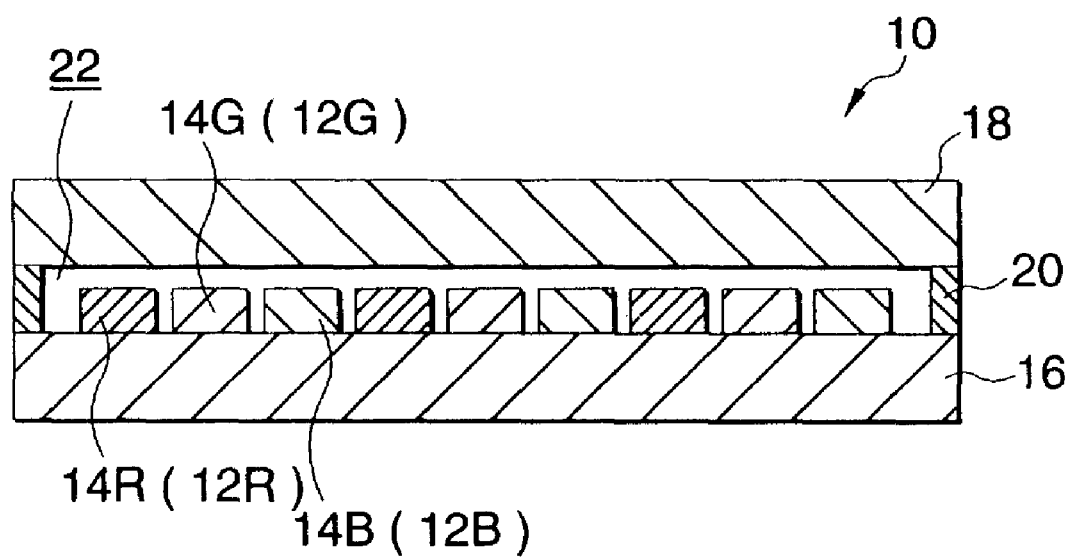
FIG. 1 is a schematic cross-sectional view showing an embodiment of the color filter of the invention.

FIG. 1 is a schematic cross-sectional view showing an embodiment of the color filter of the invention.

Figure 2A:
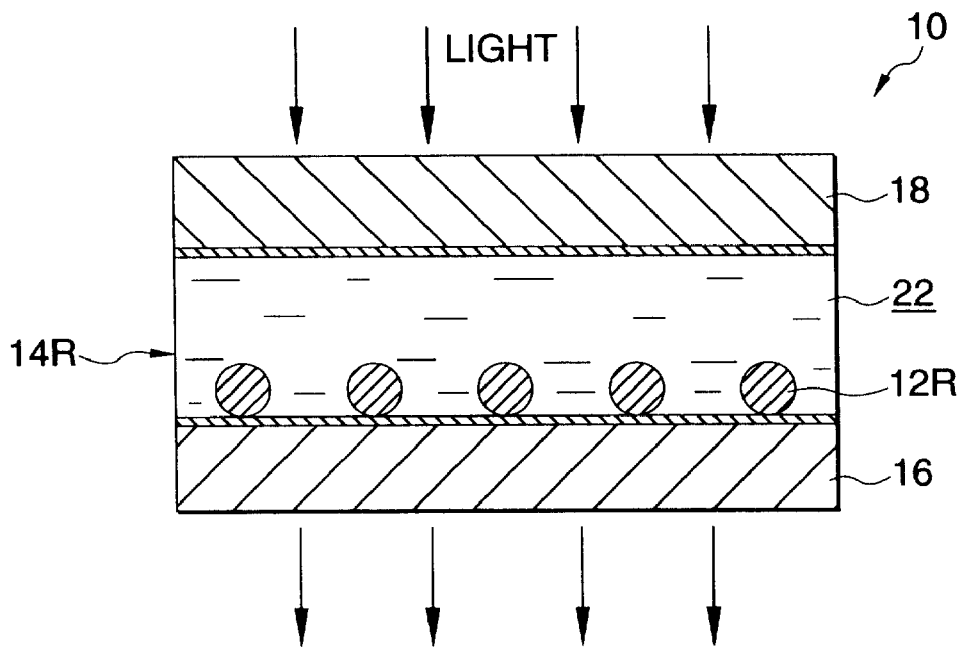
FIG. 2 is a conceptional view showing an example of the state change of a stimulus responsive colored high molecular gel used for the color filter of the invention.
Figure 2B:
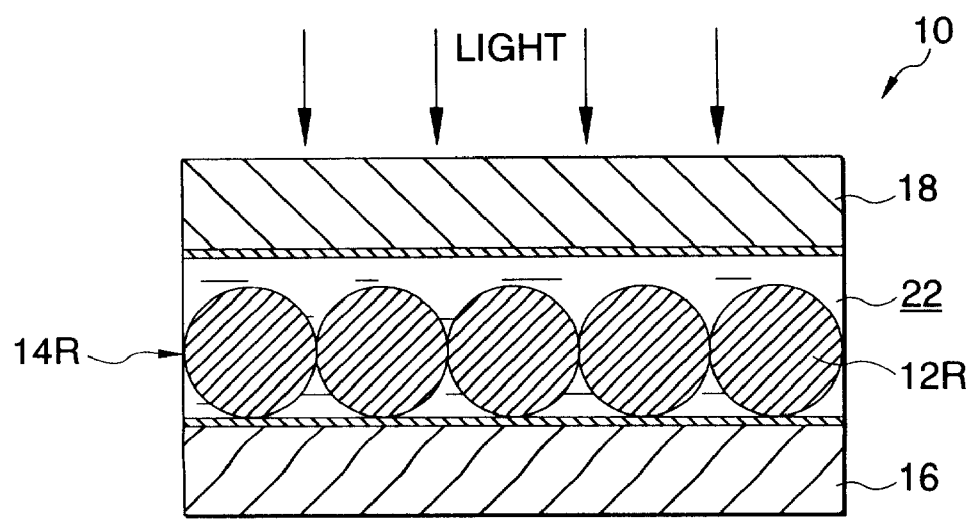

A color filter 10 has segmented color regions 14R, colored regions 14G, and colored regions 14B each formed by disposing each of a colored high molecular gel 12R of red (R), a colored high molecular gel 12G of green (G), and a colored high molecular gel 12B of blue (B) at each position of the surface of a substrate 16, respectively. A liquid 22 is sealed between the substrate 16 and a substrate 18 by sealing materials 20 and is contact with the colored high molecular gels 12R, 12G, and 12B therein. As shown in FIG. 2, each of the colored high molecular gels 12R, 12G, and 12B has a stimulus responsiveness changing reversibly in a shrunk state (FIG. 2a) by releasing a liquid 22 and in a swelled state (FIG. 2b) by absorbing the liquid 20, according to a stimulus applied from outside.

When in the swelled states of the colored high molecular gels 12R, 12G, and 12B (in FIG. 2b, the swelled states of the colored high molecular gels 12R only are shown, but same in the colored high molecular gels 12G and 12B), the color filter 10 is irradiated by light, the lights of specific wavelengths are absorbed by the colored regions 14R, 14G, and 14B (in FIG. 2b, the colored regions 14R only are shown, but same in the colored regions 14G and 14B), the color of the transmitted light is grayish white. Then, when the color filter 10 is irradiated by a light in the state of shrinking the colored high molecular gels 12R, 12G, and 12B (FIG. 2a), by applying a stimulus from a stimulus-imparting unit (not shown) (or intercepting the application of a stimulus), because the light is scarcely absorbed in each of the colored regions, the amount of the transmitted light is increased and the color of the transmitted light is bright white. When the high molecular gel 12R only is brought into a swelled state and the colored high molecular gels 12G and 12B are brought into shrunk states, the transmitted light changes to a red color. Similarly, by selectively imparting a stimulus to each of the colored high molecular gels, the amounts of the transmitted light through the colored region 14R, the colored region 14G, and the colored region 14B are changed and the color tone shown by the transmitted light can be variously changed.

In addition, in FIG. 2a and FIG. 2b, the volume changes of the colored high molecular gels are shown by two values of the shrunk state and the swelled state but the volume change in the invention is not limited to these cases and the volumes of the colored high molecular gels can be changed in multistage. When the colored high molecular gels are changed in multistage, the expression of gradation becomes possible and the color tones of very many colors can be obtained. Also, in FIG. 2, a colored region of one color is formed by plural stimulus responsive colored high molecular gels but one colored region may be formed by one colored high molecular gel.

Figure 3:
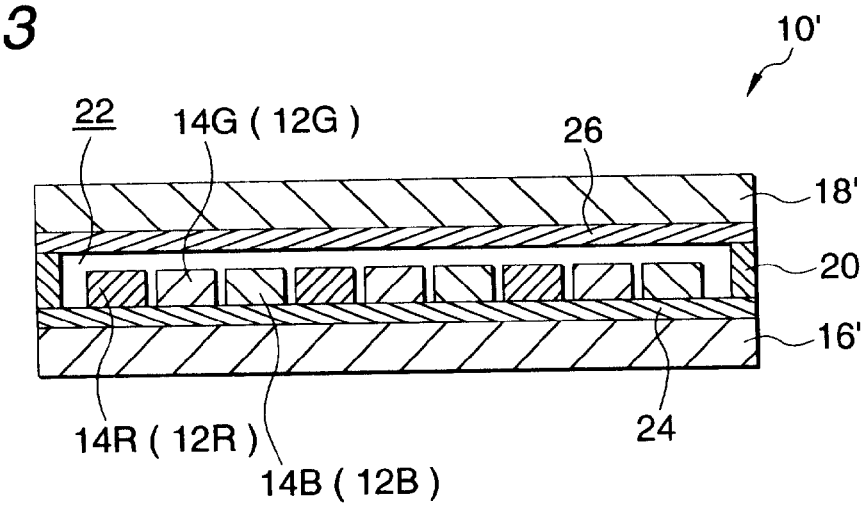
FIG. 3 is a schematic cross-sectional view showing another embodiment of the color filter of the invention.

FIG. 3 is a schematic cross-sectional view showing another embodiment of the color filter of the invention. The same members as those of FIG. 1 are shown by the same numbers and the detailed explanation of them is omitted.

A color filter 10' is constructed by holding colored high molecular gels 12R, 12G, and 12B and a liquid 22 between a substrate 16' having formed on the surface thereof a stimulus-imparting layer 24 and a substrate 18' having formed a stimulus-imparting layer 26. The colored high molecular gels 12R, 12G, and 12B are disposed on the stimulus-imparting layer 24 formed on the substrate 16' to form a colored region 14R, a colored region 14G, and a colored region 14B. The stimulus-imparting layers 24 and 26 are, for example, electrode layers and by applying a voltage to the stimulus-imparting layers 24 and 26 only of specific positions, a stimulus can be selectively imparted to the colored high molecular gels 12R, 12G, and 12B. As described above, in the color filter 10', by giving a stimulus from the stimulus-imparting layer 24 formed on the substrate 16' and the stimulus-imparting layer 26 formed on the substrate 18' to the colored high molecular gels 12R, 12G, and 12B, the color tone of the transmitted light can be variously changed by a simple construction.

In the color filter of the invention, it is preferred that the stimulus responsive colored high molecular gels of each color are disposed in a specific pattern and at a same interval. In the above-described embodiment of the invention, by forming the colored region 14R, the colored region 14G, and the colored region 14B using the colored high molecular gels of the three primary colors of R, G, and B, the display of full color by additive color mixing becomes possible, but in the invention, the system is not limited to the case and, for example, using the colored high molecular gels of cyan, magenta, and yellow, the colored regions corresponding to these colored high molecular gels are formed, respectively, and full color can be displayed by a subtractive color mixing process.

Figure 4:
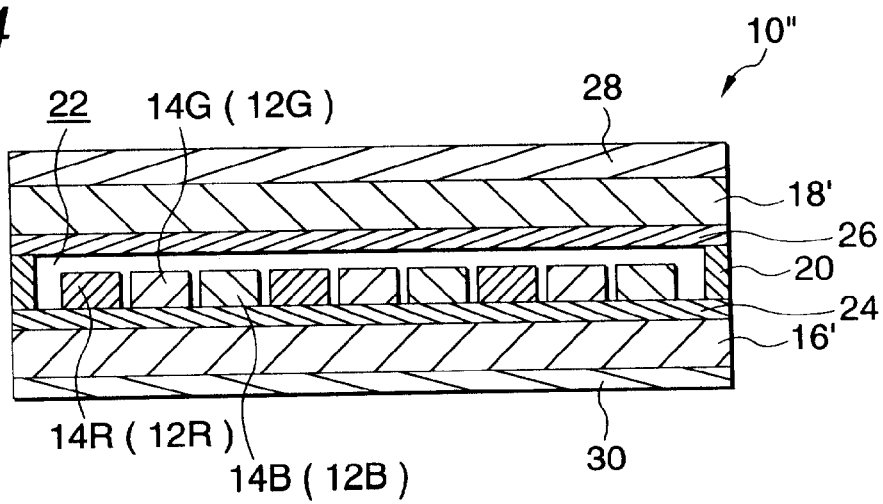
FIG. 4 is a schematic cross-sectional view showing still another embodiment of the color filter of the invention.

The construction of the color filter of the invention is not limited to the construction of the above-described embodiment but may include other member(s). For example, in the case of the color filter for a reflection-type display, as shown in FIG. 4, it is preferred to form a construction of a color filter 10" forming a layer 28 such as a reflection preventing layer, a non-glare layer, a stain preventing layer, an antistatic layer, a protective layer, etc., on the surface of a substrate 18' and also having a light reflection layer 30. Also, the stimulus-imparting layer 24 or 26 may be used as a light reflective layer. When the reflection prevention layer is formed, the reflection of light at the surface of the display element is prevented and the visibility is improved. Also, when the non-glare layer is formed, the occurrence of a reflected in phenomenon can be prevented. Furthermore, when the protective layer is formed, the surface of the substrate can be prevented from an external impact or the formation of scratches and also when the stain preventing layer or an antistatic layer is formed, the formation of stains on the surface can be prevented. Moreover, a black matrix for preventing the leakage of light may be formed between the colored regions (pixels).

Figure 5:
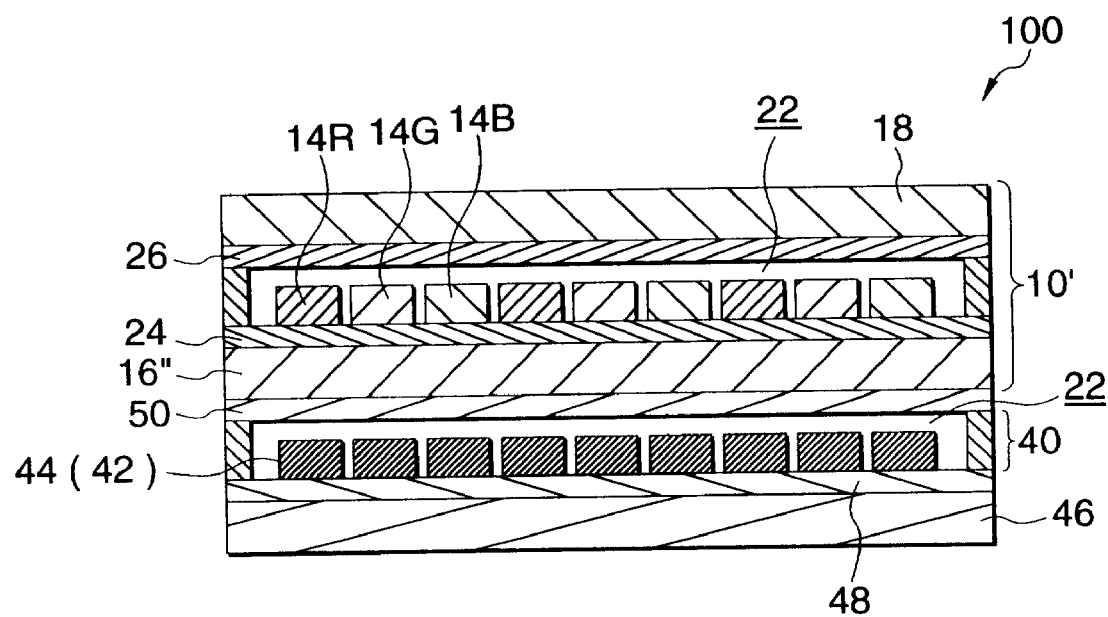
FIG. 5 is a schematic cross-sectional view showing an embodiment of the display element of the invention.

FIG. 5 is a schematic cross-sectional view showing an embodiment of applying the color filter 10' to a color display element. In addition, the same members as FIG. 1 and FIG. 2 are shown by the same numbers as those of the figures and the detailed explanation of them is omitted.

A color display element 100 is a construction of laminating a color filter 10' and a dimming layer 40. The dimming layer 40 has segmented dimming regions 44 formed by disposing a black high molecular gel 42 at definite places on the surface of a substrate 46. A liquid 22 is sealed between the substrate 46 and a substrate 16" by sealing materials 20 and is in contact with the high molecular gel 42. The high molecular gel 42 has a stimulus responsiveness of being swelled or shrunk by absorbing or releasing the liquid 22, respectively, according to a stimulus applied from outside. A stimulus-imparting layer 48 is formed on the substrate 46. On the other hand, a stimulus-imparting layer 50 is formed on the surface of the opposite side of the substrate 16" to the side forming thereon the stimulus-imparting layer 24. The stimulus-imparting layers 48 and 50 are, for example, electrodes, and by applying a voltage between the specific stimulus-imparting layers 48 and 50 only, a stimulus can be selectively imparted to the high molecular gel 42 and the light transmittance of the specific dimming regions 44 can be changed. The dimming regions 44 are disposed along the direction of the light transmittance at the positions corresponding to the colored region 14R, the colored region 14G, and the colored region 14B, receptively, and when the light transmittances of the dimming regions 44 are changed, the amount of the transmitted light to the corresponding colored regions 14R, 14G, and 14B, respectively, is changed.

Then, using FIG. 6 to FIG. 16, the color displaying function of the color display element 100 is explained.

Figure 6:
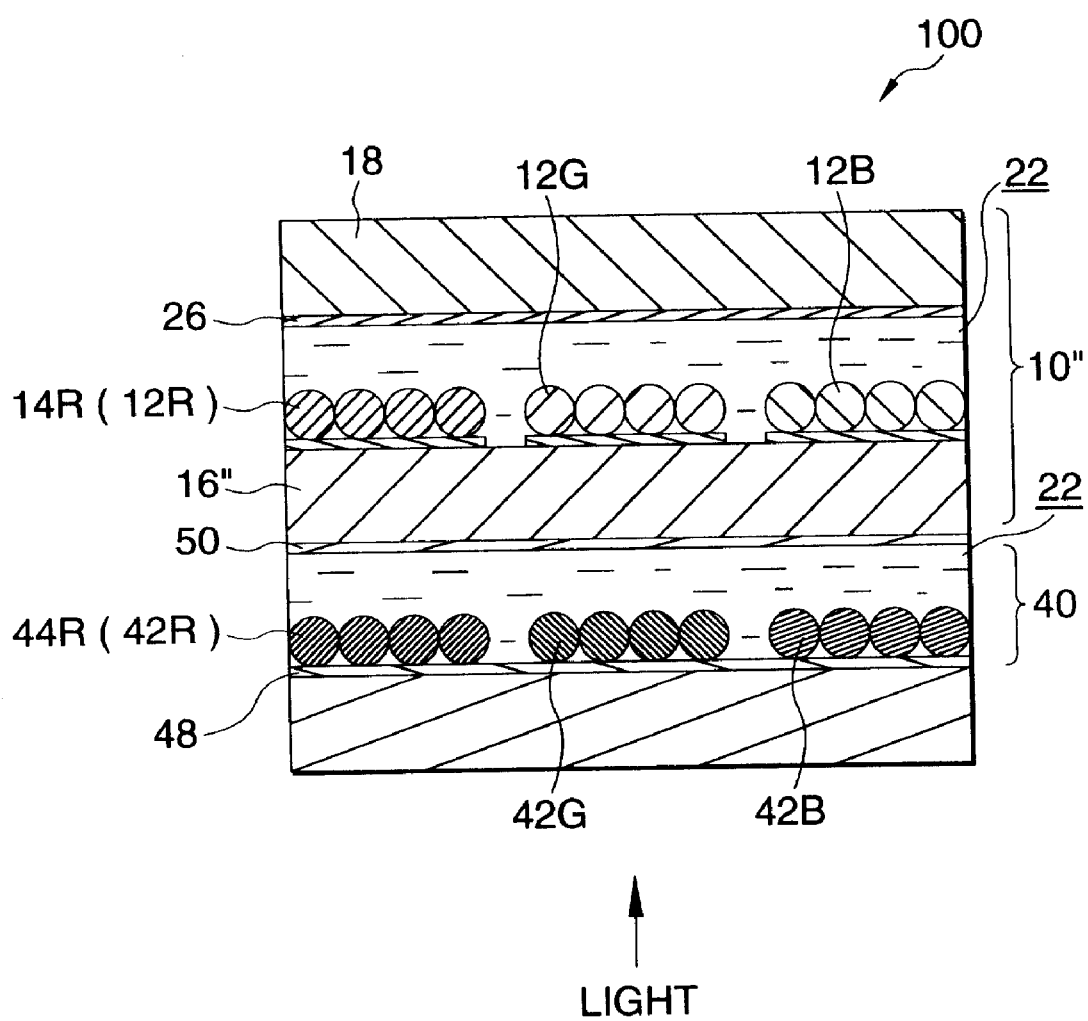
FIG. 6 is a conceptional view explaining an embodiment of the displaying method of the display element of the invention.

As shown in FIG. 6, when all the high molecular gels 42 of the dimming layer 40 (the high molecular gels 42 disposed under colored regions 14R, 14G, and 14B, respectively, are shown by 42R, 42G, and 42B, respectively. Also, the dimming regions capable of dimming the transmitted light of the colored regions 14R, 14G, and 14B, respectively, are shown as the dimming regions 44R, 44G, and 44B, respectively.) are swelled in the swelled states, the incident light to the dimming layer 40 is almost absorbed by the black high molecular gels 42 and the color display element 100 shows a black color.

Figure 7:
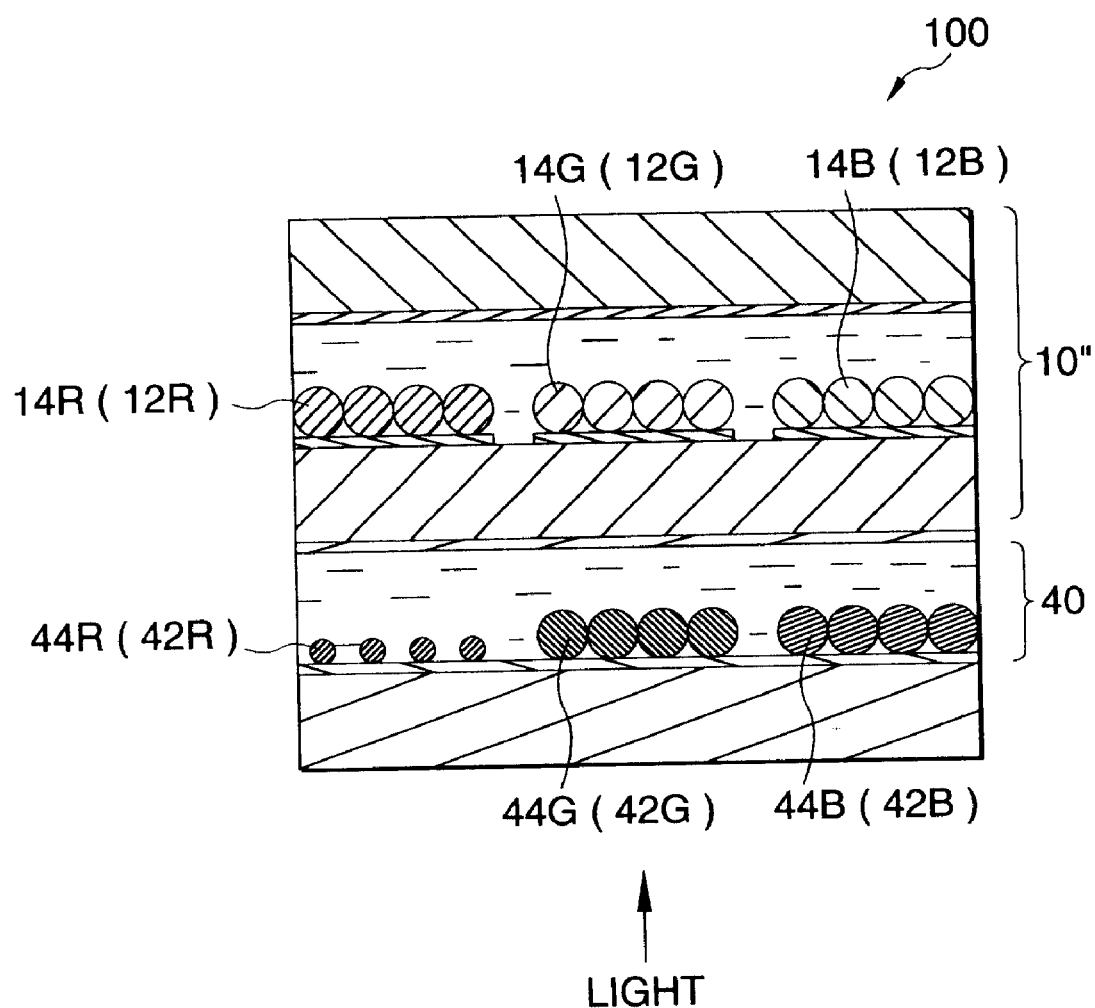
FIG. 7 is a conceptional view explaining another embodiment of the displaying method of the display element of the invention.
Figure 8:
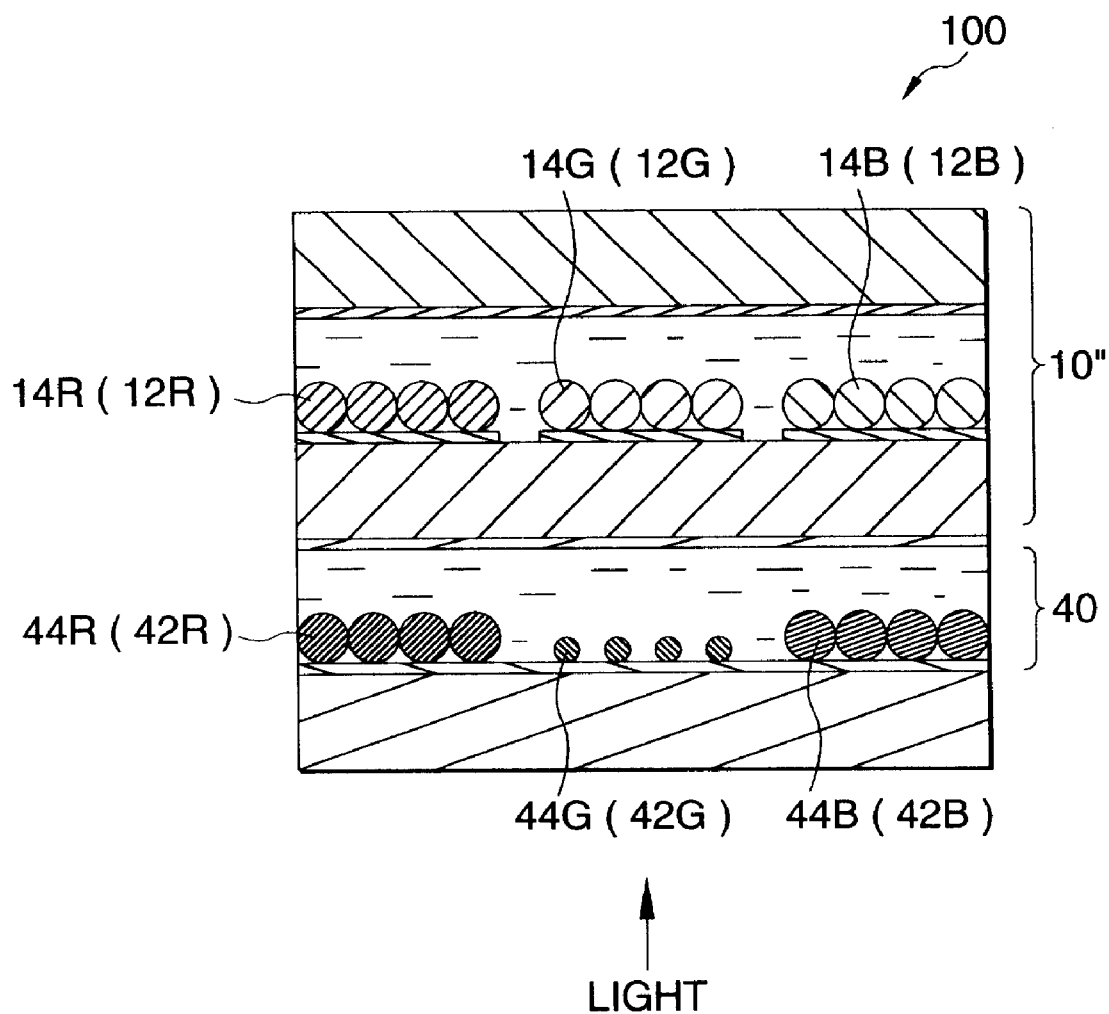
FIG. 8 is a conceptional view explaining still another embodiment of the displaying method of the display element of the invention.
Figure 9:
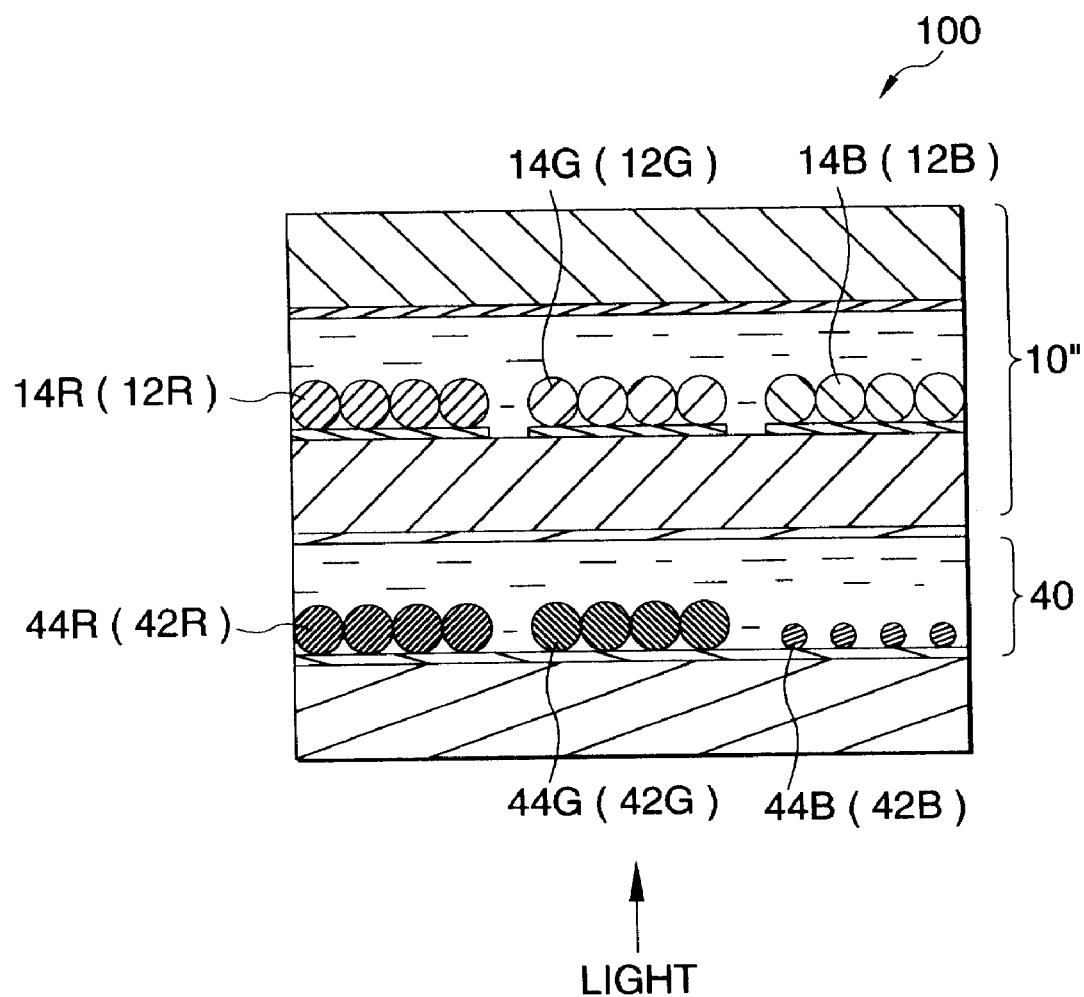
FIG. 9 is a conceptional view explaining another embodiment of the displaying method of the display element of the invention.

Then, as shown in FIG. 7, when a stimulus is applied from the stimulus-imparting layer 36 to the high molecular gels 42R of the dimming region 44R disposed under the colored region 14R, the high molecular gels 42 are shrunk by releasing a liquid 22. As the result thereof, a light transmits the colored region 14R only from the dimming region 44R, and the color display element 100 displays a red color. In FIG. 8, the high molecular gels 42G only are in a shrunk state, a light transmits the colored region 14G only from the dimming region 44G, and the color display element 100 displays a green color. In FIG. 9, the high molecular gels 42B only are in a shrunk state, a light transmits the colored region 14B only from the dimming region 44B, and the color display element 100 displays a blue color.

Figure 10:
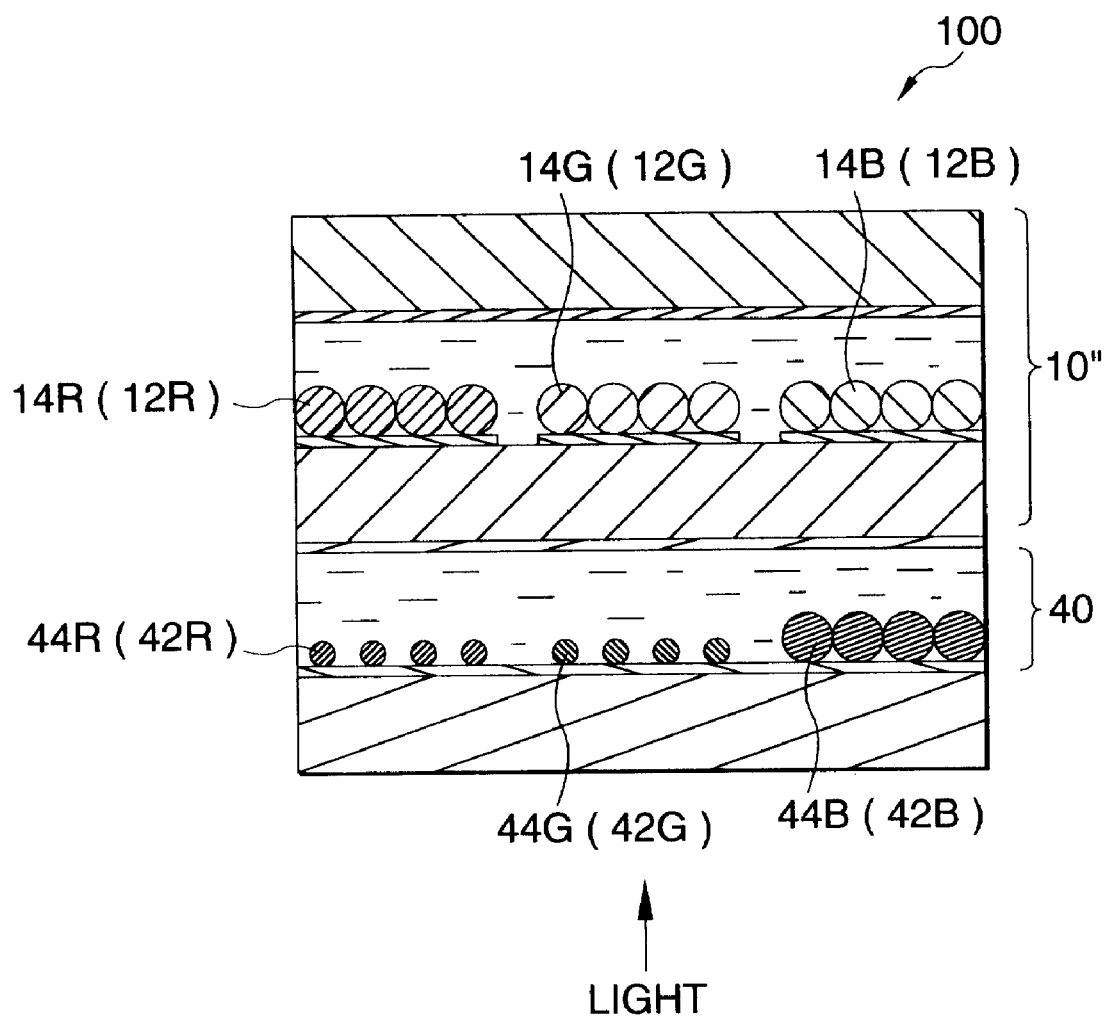
FIG. 10 is a conceptional view explaining still another embodiment of the displaying method of the display element of the invention.

In FIG. 10, by shrinking the black high molecular gels 42R and 42G in shrunk states, a light transmits the colored region 14R from the dimming region 44R and a light transmits the colored region 14G from the dimming region 44G, and the color display element 100 displays a mixed color (yellow) of a red color and a green color.

Figure 11:
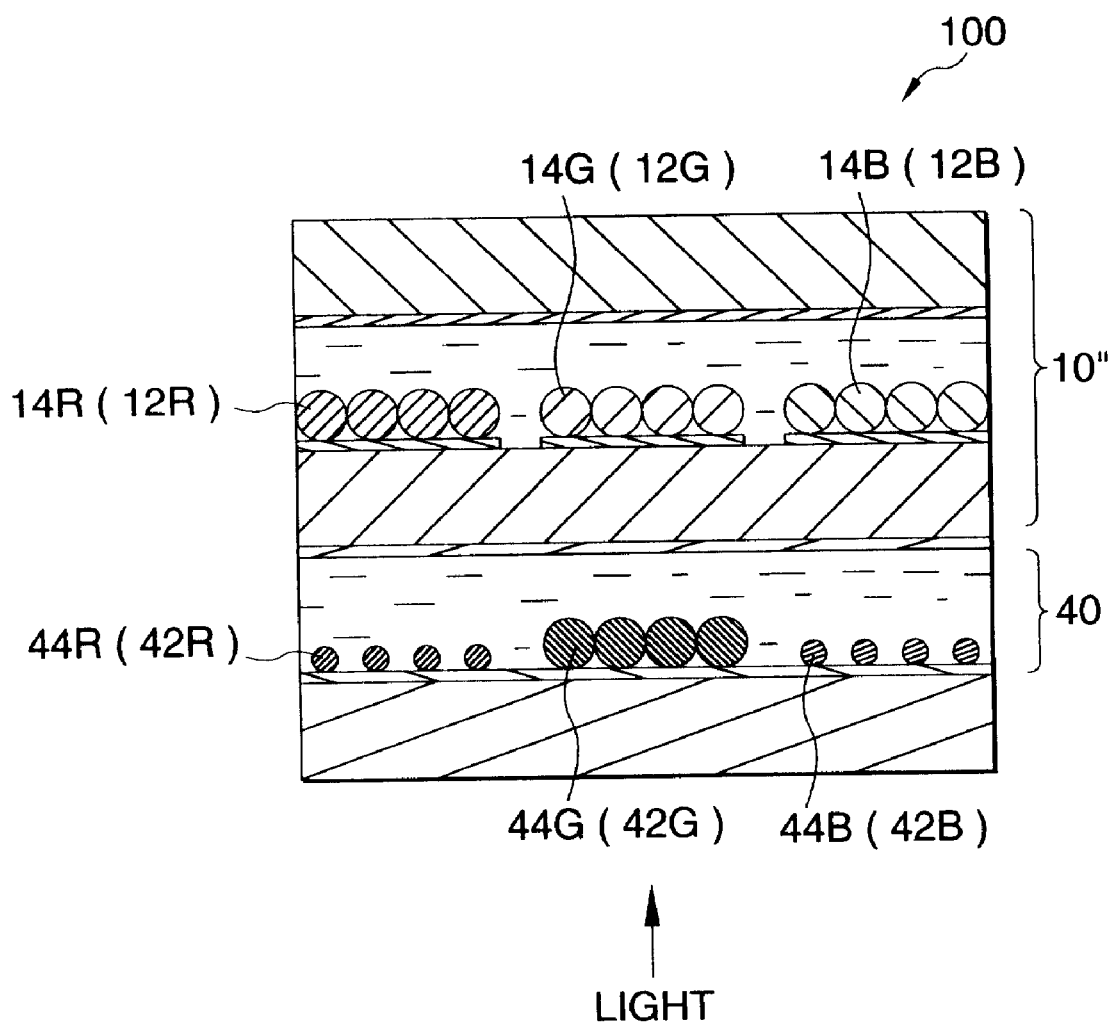
FIG. 11 is a conceptional view explaining a further embodiment of a displaying method of the display element of the invention.
Figure 12:
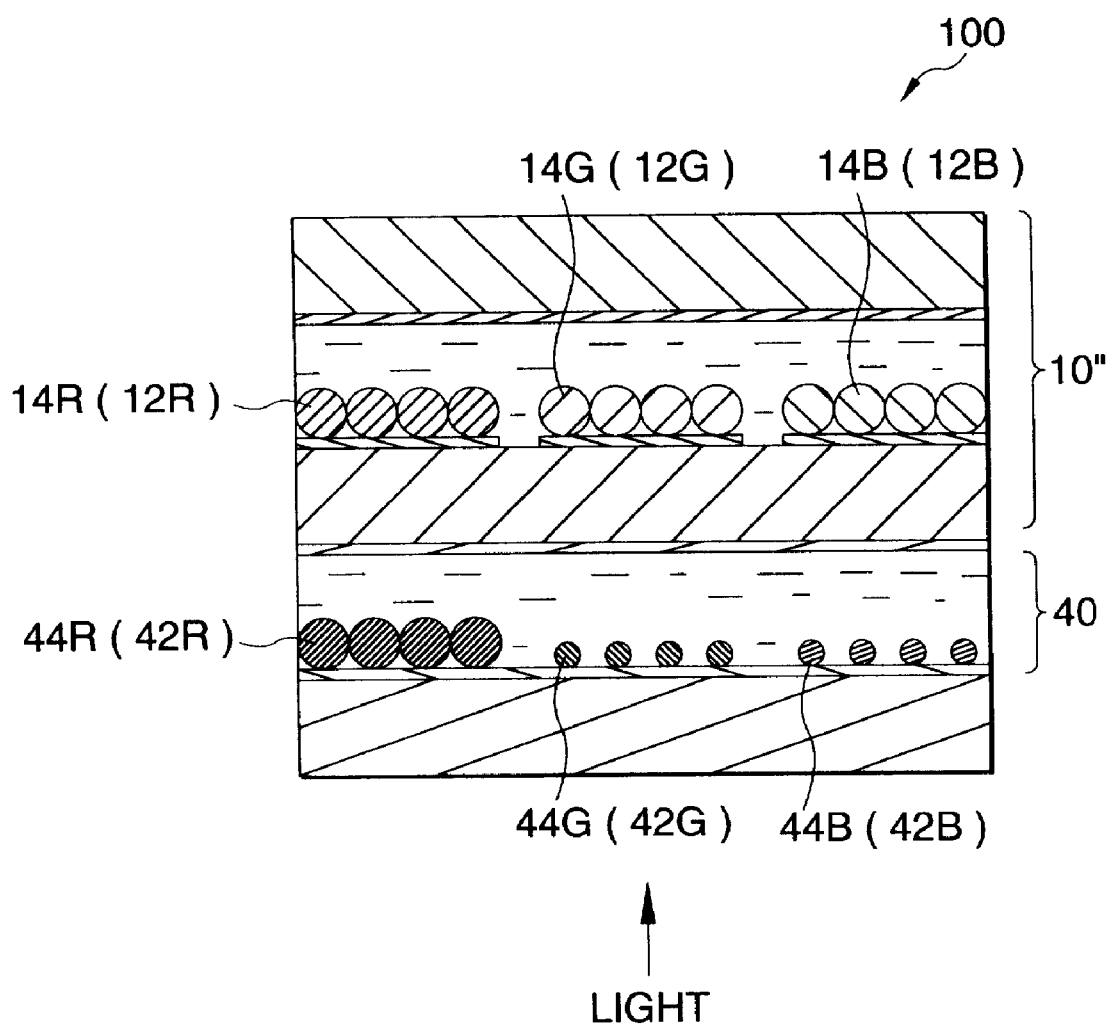
FIG. 12 is a conceptional view explaining a further embodiment of a displaying method of a further embodiment of the display element of the invention.
Figure 13:
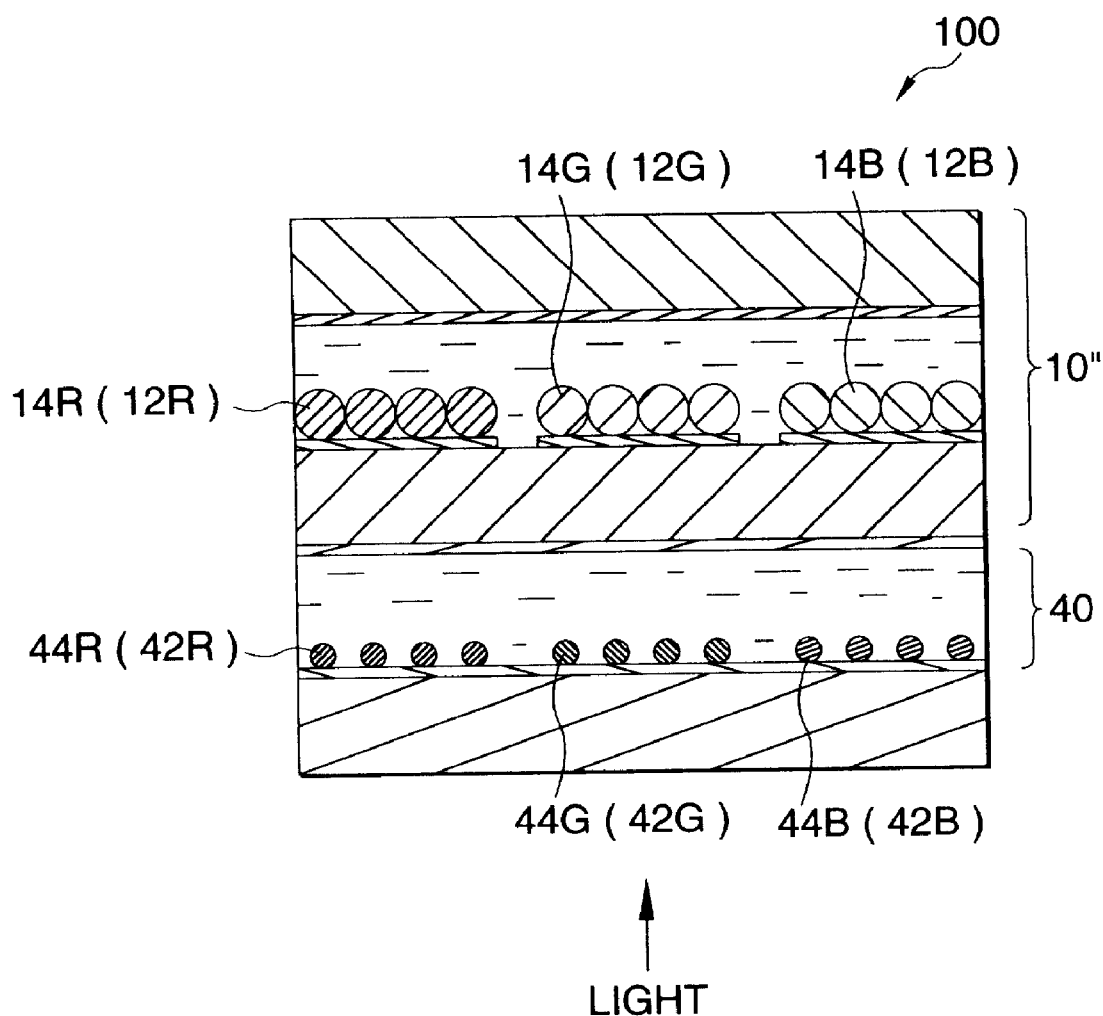
FIG. 13 is a conceptional view explaining a further embodiment of a the displaying method of further embodiment of display element of the invention.
Figure 14:
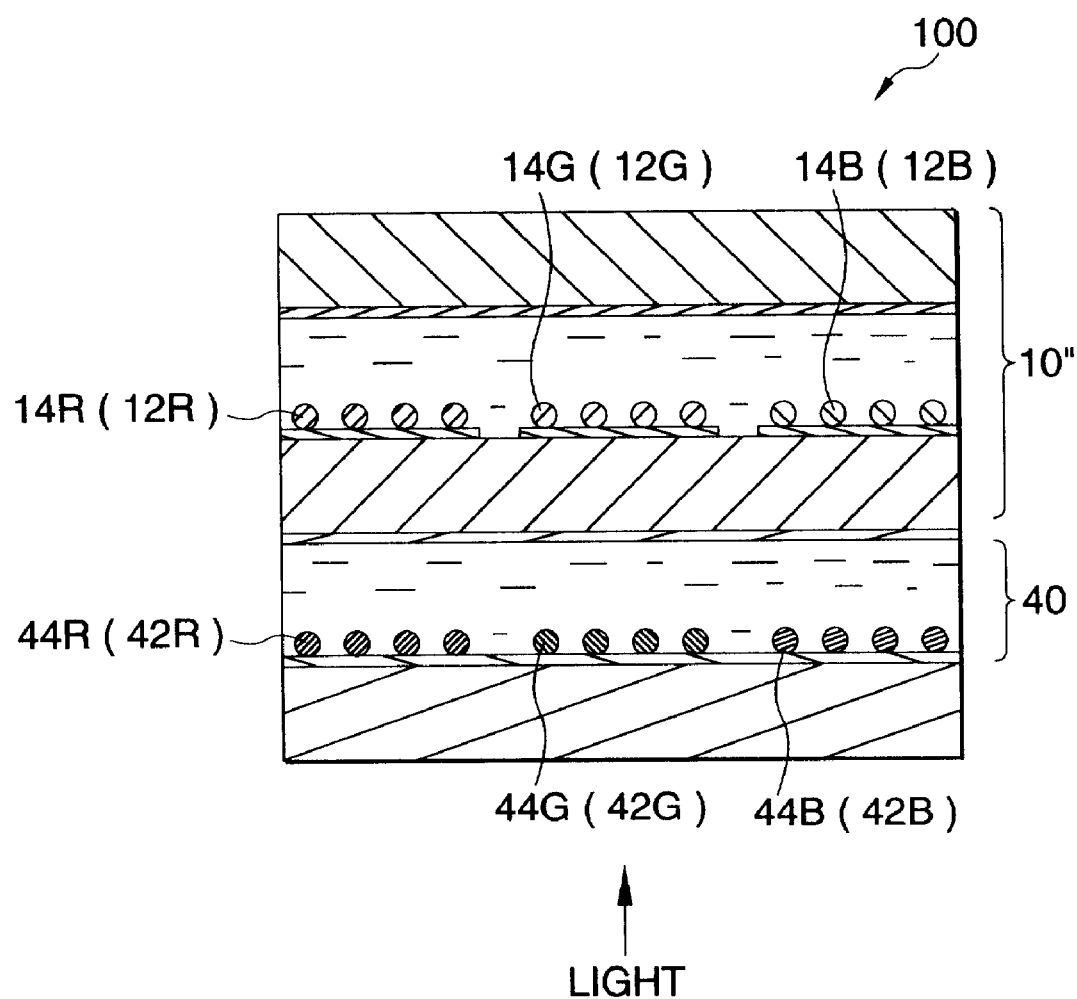
FIG. 14 is a conceptional view explaining the displaying method of still another embodiment of the display element of the invention.
Figure 15:
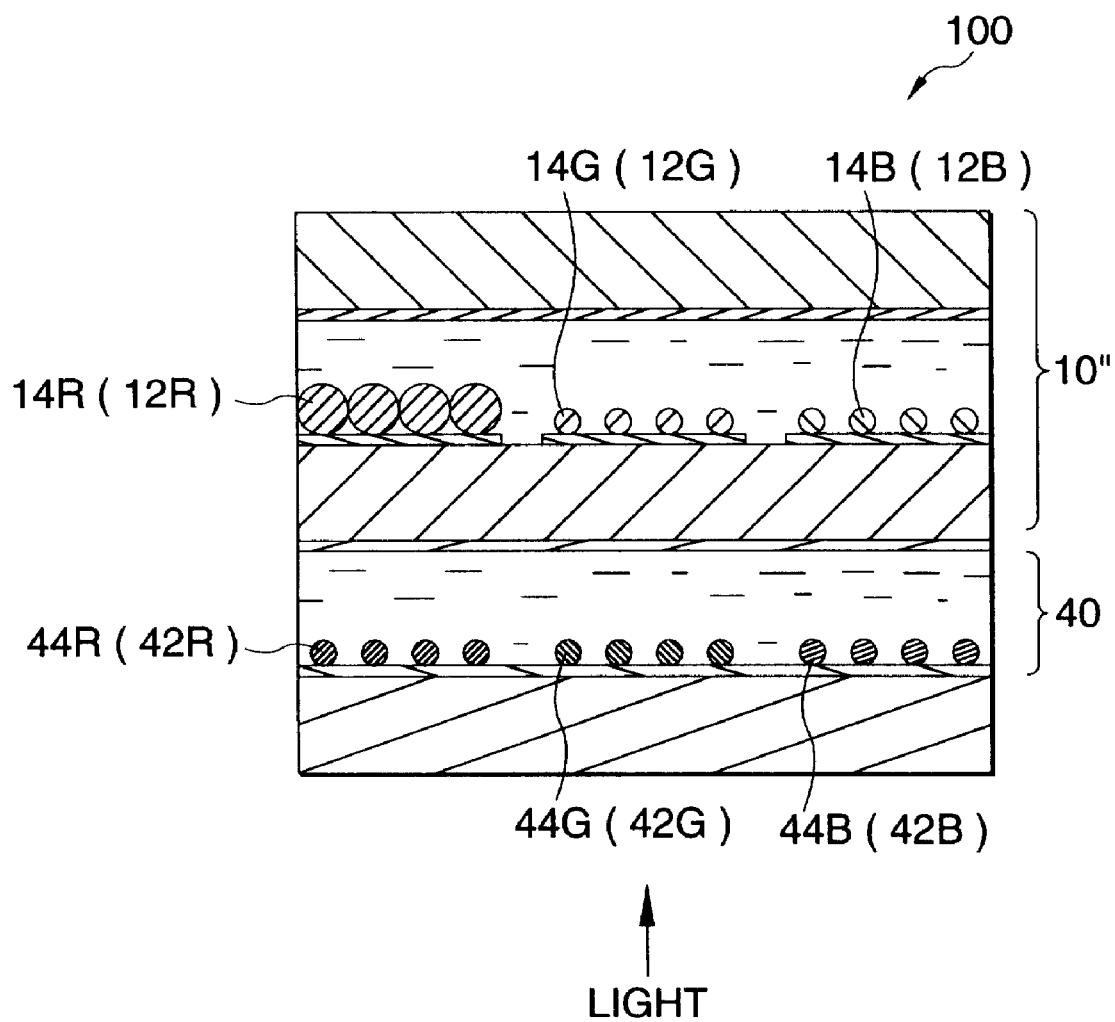
FIG. 15 is a conceptional view explaining another embodiment of the displaying method of the display element of the invention.
Figure 16:
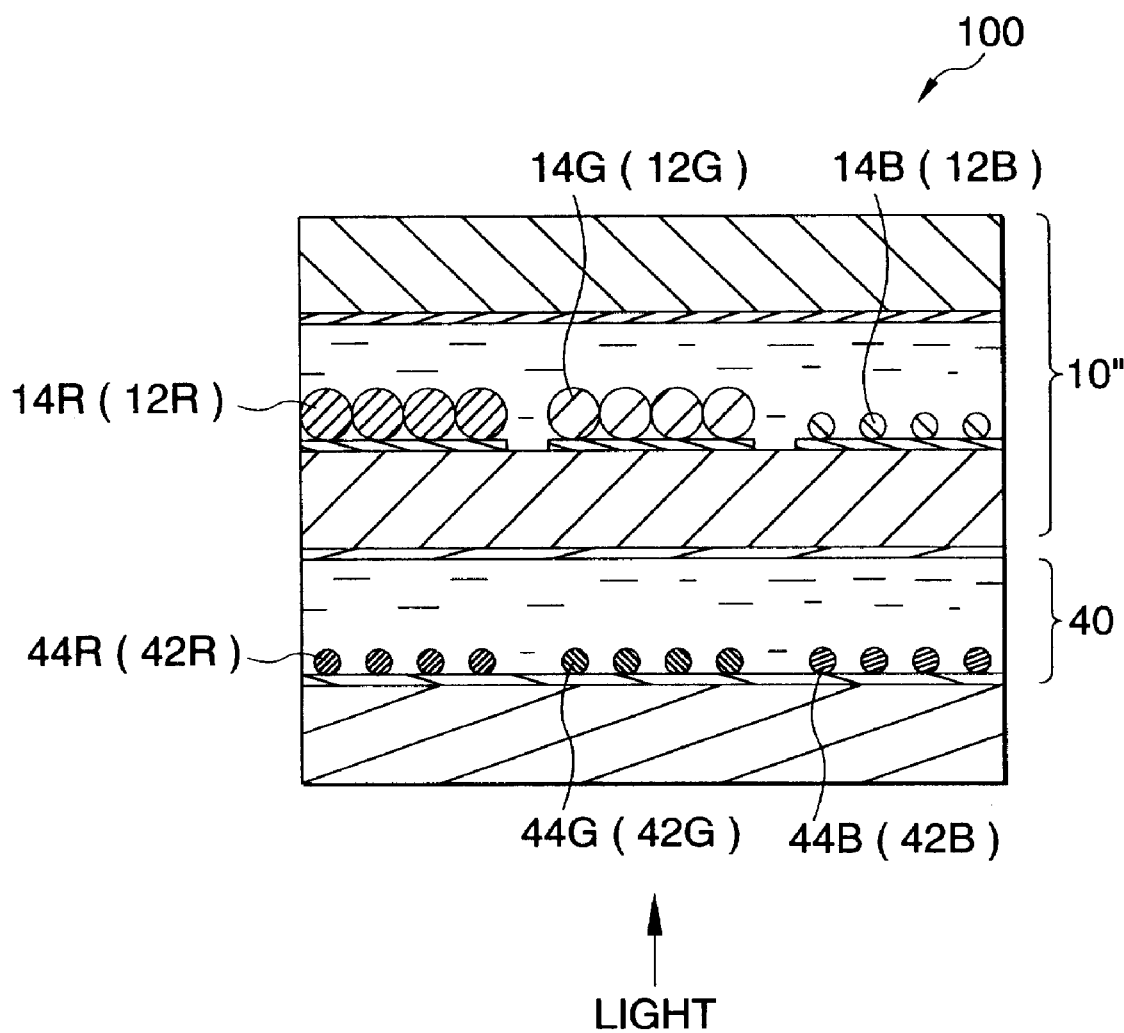
FIG. 16 is a conceptional view explaining another embodiment of the displaying method of the display element of the invention.

Similarly, in FIG. 11, the color display element 100 displays a mixed color (magenta) of a red color and a blue color, in FIG. 12, the color display element 100 displays a mixed color (cyan) of a green color and the blue color. In FIG. 13, because the black high molecular gels 42R, 42G, and 42B are all in shrunk states, the incident light into the dimming layer 40 almost all transmits the color filter 10", the light of specific wavelengths is absorbed by the colored region 14R, the colored region 14G, and the colored region 14B, and the color display element 100 displays a white color.

As described above, in the color display element 100, by selectively giving a stimulus to the black high molecular gels 42 disposed by segmented in the dimming layer 40, the amount of the transmitted light to the colored regions 14R, 14G, and 14B can be changed and as the result thereof, various colors are displayed. Also, because it is unnecessary to use a member of narrowing the angle of vision, such as a polarizing plate, etc., for the dimming element, the display having a wide angle of vision becomes possible.

Furthermore, in the color display element 100, by selectively giving a stimulus to the segmented colored high molecular gels 12R, 12G, and 12B disposed in the color filter 10", the amount of the transmitted light of the colored regions 14R, 14G, and 14B can be changed, and as the result thereof, the color tones such as the luminance, the hue, etc., can be further changed variously. For example, in FIG. 14, because the black high molecular gels 42R, 42G, and 42B are all in shrunk states and also the colored high molecular gels 12R, 12G, and 12B are all in shrunk states, the amount of the transmitted light of the dimming layer 40 and the color filter 10" is increased and the color display element 100 displays a more bright white than that of the state of FIG. 13. Also, in FIG. 15, because other high molecular gels than the colored high molecular gels 12R are in shrunk states, the amount of the transmitted light of the dimming layer 40 and the color filter 10" is increased and the color display element 100 displays a red color more brighter than and having a different color tone from the state of FIG. 7. By the similar manner, about various single colors and mixed colors (FIG. 16), the color display element 100 can display more brighter color having a different color tone.

As described above, in the color display element 100 of the invention, because the amount of the transmitted light of the dimming layer 40 and the color filter 10 can be changed", the light utilization efficiency can be improved, a bright display is possible, and also a display enriched in the color tones of the displayed colors becomes possible.

In addition, in FIG. 6 to FIG. 16, the volume changes of the colored high molecular gels 12R, 12G, and 12B and the high molecular gels 42R, 42G, and 42B are shown by two values of the shrunk states and the swelled states but the volumes changes of them are not limited to the two values described above but the volumes of the high molecular gels can be changed in multistage. By changing the volumes of the high molecular gels in multistage, the expression of gradation becomes possible and colors of very many color tones can be obtained.

Figure 17:
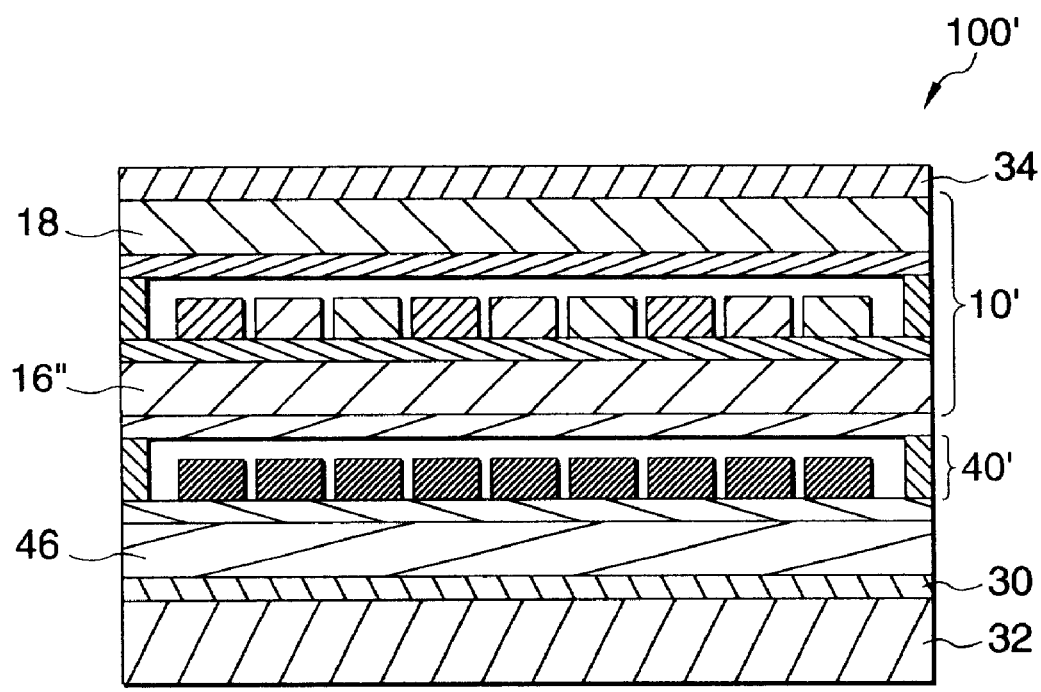
FIG. 17 is a schematic cross-sectional view showing another embodiment of the display element of the invention.

In FIG. 17, a color display element 100' of a construction having a translucent light reflection layer 30 such as a half mirror and a back light layer 32 is shown. By such a construction, the color display element is utilized as a reflection-type display element in a bright state or environment, and in the case of becoming dark by lowering the amount of an incident light from outside, a light can be supplied from the back light layer 32. As the result thereof, a more bright display becomes possible at a low consumed electric power. Furthermore, for the purpose described above, a layer 34 such as a reflection preventing layer, a non-glare layer, a stain preventing layer, an antistatic layer, a protective layer, etc., can be formed on the surface of a substrate 18. As other embodiment, the color display element 100' may be a construction including various members such as a driving circuit, a driving wiring, a microlens for increasing the light utilization efficiency of the color filter 10', a black matrix for preventing the leakage of light, etc.

In addition, when the color display element of the invention is used as a light-transmission type display element, the light reflection layer 30 becomes unnecessary. Also, when the color display element is used as a light-reflection type display element, the back light layer becomes unnecessary.

Figure 18:
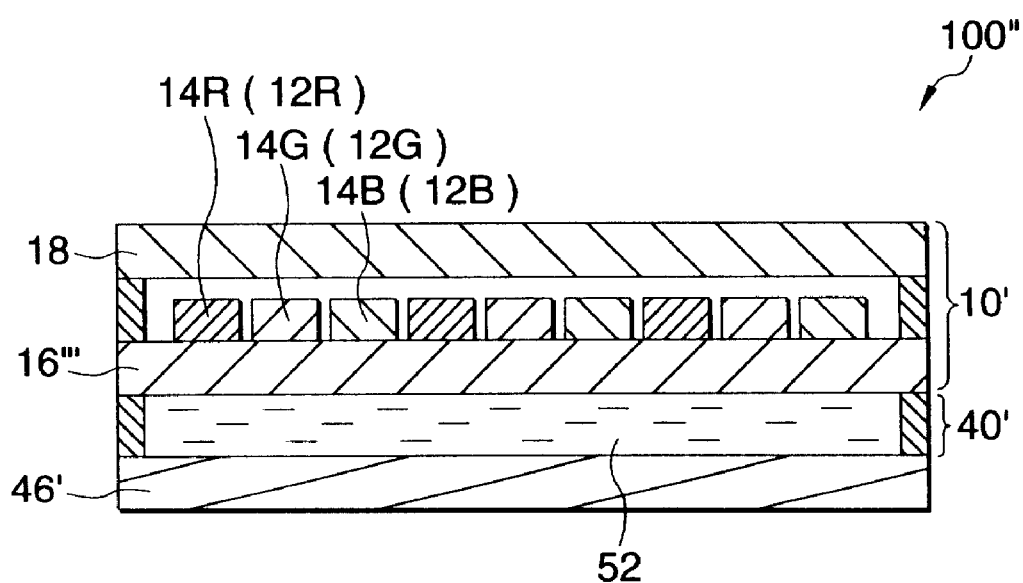
FIG. 18 is a schematic cross-sectional view showing still another embodiment of the display element of the invention.

FIG. 18 shows other embodiment of the color display element of the invention wherein a color filter 10' is applied to the color display element. In addition, the same members as those in FIG. 1, FIG. 2, and FIG. 5 are shown by the same numbers as in these figures and detailed explanation of them is omitted.

In FIG. 18, a color display element 100" is a construction formed by laminating a color filter 10' and a liquid crystal dimming layer 40'. The liquid crystal dimming layer 40' is constructed by sealing a liquid crystal 52 between a substrate 46' and a substrate 16'''. On the substrate 46' are formed segmented electrodes (not shown) and on the surface of the opposite side of the substrate 16''' to the surface side of forming a stimulus-imparting layer 24 are formed electrodes (not shown). By applying a voltage between specific electrodes only facing each other, the liquid crystal 52 only at the positions corresponding to the specific colored regions 14 (including 14R, 14B, and 14G) can be selectively oriented to the light-transmitting direction. As the result thereof, the amount of the transmitted light to the specific colored regions 14 is changed and the color display element 100" can display colored of various hues.

In the color display element 100", by making the colored high molecular gels 12R, 12G, and 12B in the color filter 10' shrunk states, the utilization efficiency of light can be more increased than the case of using a color filter of prior art and the display of a bright white color becomes possible. Also, in the case of displaying a single color or a mixed color, by making the colored high molecular gels forming remaining one or two colored regions shrunk state, a bright display becomes possible even in a single color or a mixed color. Accordingly, the color display element 100" can display bright and wide color tones as compared with a construction using a color filter of prior art.

Figure 19:
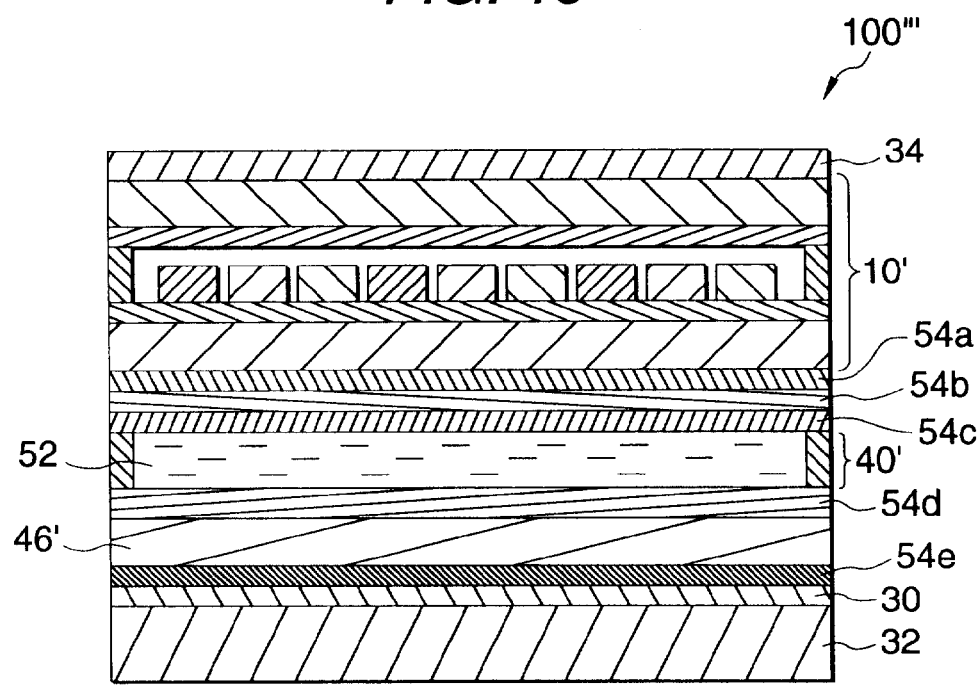
FIG. 19 is a schematic cross-sectional view showing another embodiment of the display element of the invention.

It is preferred that the color display element of the invention utilizing the liquid crystal dimming layer 40' is a construction having various functional layers 54 (shown by 54a to 54e in FIG. 19) at both surface sides of the liquid crystal dimming layer 40' as the color display element 100''' shown in FIG. 19. As the functional layer 54, there are, for example, an oriented film, a polarizer, an optical compensation film, a phase-different film, etc. In these layers, the optical compensation film and the phase-different film are formed for the purposes of optimizing the dimming function and the color tone, and enlarging the angle of vision. In FIG. 19, a construction of disposing, as the functional layers 54, polarizing films as a layer 54a and a layer 54e, an optical compensation film as a layer 54b, and oriented films as a layer 54c and a layer 54d is shown. Furthermore, in the color display element 100''', a protective layer 34, a translucent light reflecting layer 30, and a back light layer 32 are formed for the same purposes as described above.

In addition, in the color display element 100''', two layers of the polarizing film are formed but in a reflection type display element, the polarizing film may be one layer. When a GH liquid crystal is used, the polarizing film becomes unnecessary. Also, the disposition of the polarizing film is not limited to the place shown in FIG. 19. When the color display element is a light-transmission type display element, the light reflection layer 30 becomes unnecessary. Also, when the color display element is a light-reflection type display element, the back light layer 32 is usually unnecessary.

As the liquid crystal dimming element, those having a general construction can be used. The type of the liquid crystal used in the invention includes a twisted nematic (TN) liquid crystal, super twisted nematic (STN) liquid crystal, a guest-host (GH) liquid crystal, a ferroelectric liquid crystal, an antiferrodielectric liquid crystal, a polymer dispersion liquid crystal, etc. In these liquid crystals, the TN liquid crystal, the STN liquid crystal, and the GH liquid crystal are particularly preferred. Also, particularly, in the display element of a mode using the TN liquid crystal or the STN liquid crystal and utilizing double refraction, the utilization of a polarizer or the formation of a liquid crystal oriented film or of an optical compensation layer widening the angle of vision is preferably practiced as in a known technique. In the application of an electric field to the liquid crystal dimming layer, various electrode layers, a TFT element, an MIM element, etc., can be used. Also, a driving circuit can be formed on the substrate of the liquid crystal dimming layer as in a known technique.

The dimming element which can be utilized for the display element of the invention includes various light-emission type dimming elements such as an electrochromic dimming element (ECD), an electrophoresis dimming element, an electroluminescence element (EL), LED, CRT, etc. When the dimming element utilizing the TN liquid crystal, the GH liquid crystal, an organic EL, or an inorganic EL is used, the display element is excellent in the view points of a brightness and a consumed electric power. Also, when a dimming element utilizing the black stimulus responsive high molecular gel is used as the dimming element, as described above, the light utilization efficiency of the display element is high and also the color tone can be variously changed and further a display of a wide angle of vision becomes possible.

The construction of the display element of the invention is not limited to the constructions of the above-described embodiments and, for example, the display element may be a construction wherein the color filter and the dimming layer are reversely laminated. Also, in the above-described embodiments, one substrate is used for the color filter and the dimming layer together but the display element may be a construction that each substrate is separately formed to each element.

Then, various members used for the color filter and the display element of the invention are explained.

The stimulus-responsive colored high molecular gel used in the invention means a high molecular gel which changes the state thereof when an external stimulus, such as a pH change, an ion concentration change, a change of the absorbed or desorbed amount of a chemical substance, a light, a heat, an electric current, an electric field, a magnatic field, etc., is applied to the high molecular gel, and returns to the original state when the application of the stimulus is intercepted. As the state change, a reversible volume change (swelling and shrinking) of the high molecular gel caused by absorbing or desorbing the liquid in contact with the high moleculargel is preferred. When the stimulus-responsive high molecular gel reversibly changing the volume thereof is used, accompanied by the volume change, the light-absorbing area of the high molecular gel and the light absorbing efficiency of the color material contained in the high molecular gel are changed, and the light transmittance can be reversibly change.

Then, practical examples of the stimulus responsive high molecular gel which can be preferably used in this invention are shown but the stimulus responsive high molecular gels used in this invention are not limited to the practical examples shown below. In addition, in the following description, the description of "(meth)" means that the compounds include the compounds having the description therein.

As the stimulus responsive high molecular gel responsive to the pH change by an electrode reaction, etc., an electrolyte-base high molecular gel is preferred. Practical examples of the electrolyte-base high molecular gel include the crosslinked products of poly(meth)acrylic acid and the metal salts thereof; the crosslinked products of the copolymer of (meth) acrylic acid and at least one kind selected from (meth)acrylamide, hydroxyethyl (meth)acrylate, a (meth)acrylic acid alkyl ester, a dialkylaminoalkyl (meth) acrylamide, etc., and the quaternary salts and salts thereof; the crosslinked products of the copolymer of maleic acid and at least one kind selected from (meth)acrylamide, hydroxyethyl (meth)acrylate, a (meth)acrylic acid alkyl ester, etc., and the salts thereof; the crosslinked products of polyvinylsulfonic acid and the salts thereof; the crosslinked products of polyvinylsulfonic acid and the metal salts thereof; the crosslinked products of a copolymer of vinylsulfonic acid and at least one kind selected from (meth)acrylamide, hydroxyethyl (meth)acrylate, a (meth)acrylic acid alkyl ester, etc., and the salts thereof; the crosslinked products of the copolymer of vinylbenzenesulfonic acid and at least one kind selected from (meth)acrylamide, hydroxyethyl (meth) acrylate, a (meth)acrylic acid alkyl ester, etc., and the metal salts thereof; the crosslinked products of poly(meth) acrylamide alkylsulfonic acid and the metal salts thereof; the crosslinked products of the copolymer of (meth)acrylamide alkylsulfonic acid and at least one kind selected from (meth) acrylic acid, (meth)acrylamide, hydroxyethyl (meth) acrylate, a (meth)acrylic acid alkyl ester, etc., and the salts thereof; the crosslinked products of polydimethylaminopropyl (meth)acrylamide and the quaternary salts thereof; the crosslinked products of a copolymer of dimethylaminopropyl (meth)acrylamide and at least one kind selected from (meth)acrylamide, hydroxyethyl (meth)acrylate, a (meth) acrylic acid alkyl ester, etc., and the salts and quaternary salts thereof; the crosslinked products of the complex of polydimethylaminopropyl (meth)acrylamide and polyvinyl alcohol and the quaternary salts thereof; the drosslinked products of complex of polyvinl alcohol and poly (meth) acrylic acid and the salts thereof; the crosslinked products of a carboxyalkyl cellulose salt; the partially hydrolyzed products of the crosslinked products of poly(meth)acrylonitrile and the salts thereof; etc.

In these materials, the crosslinked product of poly(meth) acrylic acid and the salts thereof; the crosslinked product of the copolymer of (meth)acrylic acid and (meth)acrylamide and the salts thereof; the crosslinked products of a copolymer of maleic acid and at least one kind selected from (meth)acrylamide, hydroxyethyl (meth)acrylate, a (meth) acrylic acid, dialkylamino alkyl (meth)acrylamide, (meth) acrylic acid alkyl ester, etc., and the salts and quaternary salts thereof; and the crosslinked product of the complex of polyvinyl alcohol and poly(meth)acrylic acid and the salts thereof are preferred.

As the stimulus responsive high molecular gel responsive to the change of the adsorbed or desorbed amount of a chemical substance such as a surface active agent, etc., by an electric field, strong ionic high molecular gels are preferred. Practical examples of the strong ionic high molecular gel include the crosslinked products of polyvinylsulfonic acid and the salts thereof; the crosslinked products of a copolymer of vinylsulfonic acid and at least one kind selected from (meth)acrylamide, hydroxyethyl (meth)acrylate, a (meth) acrylic acid alkyl ester, etc., and the salts thereof; the crosslinked products of polyvinylbenzenesulfonic acid and the salts thereof; the crosslinked products of a copolymer of vinylbenzenesulfonic acid and at least one kind selected from (meth)acrylamide, hydroxyethyl (meth)acrylate, a (meth)acrylic acid alkyl ester, etc., and the salts thereof; the crosslinked products of a poly(meth)acrylamide alkylsulfonic acid and the salts thereof; the crosslinked products of a copolymer of a (meth)acrylamide alkylsulfonic acid and at least one kind selected from (meth)acrylamide, hydroxyethyl (meth)acrylate, a (meth)acrylic acid alkyl ester, etc., and the salts thereof; etc. In these materials, the crosslinked products of polyvinylsulfonic acid and the salts thereof; the crosslinked products of polyvinylbenzenesulfonic acid and the salts thereof; and the crosslinked products of a poly (meth)acrylamide alkylsulfonic acid and the metal salts thereof are preferred. By combining these high molecular gels with a cationic surface active agent such as the alkylpyridinium salt, the alkylammonium salt, or the phenylammonium salt of n-dodecylpyridinium chloride, etc.; the phosphonium salt of tetraphenylphosphonium chloride, etc., etc., and by changing the adsorbed or desorbed amount of the cationic surface active agent to the high molecular gel, the high molecular gel can be volume-changed. If the above compounds are the salts, metal salts are preferred.

As the stimulus responsive high molecular gel responsive to an electric oxidation and reduction, the CT complex (charge transfer complex) of a cationic high molecular gel and a electron acceptive compound is preferred. Practical examples of the CT complex include the crosslinked products of a poly[N-alkyl-substituted aminoalkyl (meth) acrylamide] such as polydimethylaminopropyl (meth) acrylamide, etc.; the crosslinked products of a poly(meth) acrylic acid N-alkyl-substituted alkyl ester such as polydimethylaminoekhyl (meth)acrylate, polydiethylaminoethyl (meth)acrylate, etc.; the crosslinked products of polystyrene; the crosslinked products of polyvinylpyridine; the crosslinked products of polyvinyl carbazole; the crosslinked products of polydimethylaminostyrene; etc. In these materials, the crosslinked products of an N-alkyl-substituted alkyl(meth)acrylamide are preferred. By combining these high molecular gels and an electron acceptive compound such as benzoquinone, 7,7,8,8,-tetracyanoquinodimethane (TCNQ), tetracyanoethylene, chloranil, trinitrobenzene, maleic anhydride, iodine, etc., the volume change becomes possible according to an electric oxidation and reduction.

As the stimulus responsive high molecular gel responsive to heat, the crosslinked products of the high molecules having an LCST (lower critical solution temperature), an IPN material (interpenetrating polymer network structural material) of a high molecular gel of two components making hydrogen bond with each other, and an ionic gel having an aggregating side chain, etc., are preferred. Usually, the LCST gel has a property of shrinking at a high temperature, and, on the other hand, the IPN material and the ionic gel have a property of swelling at a high temperature. Practical examples of the LCST gel include the crosslinked products of a poly[N-alkyl-substituted (meth)acrylamide] such as poly N-isopropylacrylamide, etc.; the crosslinked products of a copolymer of an N-alkyl-substituted (meth)acrylamide and at least one kind selected from (meth) acrylic acid, (meth)acrylamide, a (meth)acrylic acid alkyl ester, etc., and the metal salts thereof; the crosslinked products of polyvinyl methyl ether; the the metal salts thereof; the crosslinked products of polyvinyl methyl ether; the crosslinked products of an alkyl-substituted cellulose derivative such as methyl cellulose, ethyl cellulose, hydroxypropyl cellulose, etc.; etc. On the other hand, practical examples of the IPN material and the ionic gel include an IPN material made of the crosslinked product of poly(meth)acrylamide and the crosslinked product of poly(meth)acrylic acid and the partially neutralized product thereof (the product obtained by partially making a metal salt of the acrylic acid unit); the crosslinked products of the copolymer of a (meth) acrylic acid ester having a long-chain alkyl group and (meth)acrylic acid and the metal salts thereof; the crosslinked products of the copolymer of an aromatic monomer and (meth) acrylic acid and the metal salts thereof; etc. In these materials, the crosslinking products of a poly[N-alkyl-substituted (meth) acrylamide]; the IPN material made of the crosslinking product of a poly (meth) acrylamide and the crosslinked product of poly(meth)acrylic acid the partial neutralized product thereof; the crosslinking products of the copolymer of a (meth) acrylic acid ester having a long-chain alkyl group and (meth)acrylic acid and the metal salts thereof; the crosslinked products of the copolymer of an aromatic monomer and (meth) acrylic acid and the metal salts thereof; etc., are preferred.

As the stimulus responsive high molecular gel responsive to light, the crosslinked products of a hydrophilic high molecular compound having a group of causing an ionic dissociation by light, such as a triarylmethane derivative and a spirobenzopyran derivative, etc., are preferred. Practical examples thereof include the crosslinked products of a copolymer of a vinyl-substituted triarylmethane leuco derivative and acrylamide, etc. In these materials, the crosslinked product of a copolymer of a vinyl-substituted triarylmethane leuco derivative and acrylamide is preferred.

As the stimulus responsive high molecular gel responsive to magnetism, there are crosslinked products of polyvinyl alcohol containing ferromagnetic particles, a magnetic fluid, etc.

It is preferred that the volume changing amount of the stimulus responsive high molecular gel by a stimulus is large, and the volume ratio at swelling or shrinking is preferably at least 5, more preferably at least 10, and fur more preferably at least 15.

As the stimulus responsive high molecular gel, the high molecular gel having various forms such as a sphere, a cube, an ellipsoid, a polyhedron, a porous member, a fibrous form, a star form, an acicular form, a hollow form, etc., can be utilized. As the size of the stimulus responsive high molecular gel particles, in the state of not containing the liquid, the average particle size is preferably from 0.1 $\mu$m to 1 mm, and more preferably from 1 $\mu$m to 500 $\mu$m. When the particle size is smaller than 0.1 $\mu$m, there occur problems that handling of the particles becomes difficult, the excellent optical characteristics are not obtained, etc. On the other hand, when the particle size exceeds 1 mm, there are problems that the responding speed required to cause the volume change of the high molecular gel is delayed, etc.

The stimulus responsive colored high molecular gel used for the color filter of the invention contains a color material (having a color) at above a definite concentration. Also, the black stimulus responsive high molecular gel used for the dimming element contains a black color material at above a definite concentration.

As the color material contained in the stimulus responsive high molecular gels, dyes, inorganic pigments, organic pigments, etc., are preferred. Also, it is preferred that the color material is physically or chemically fixed to the stimulus responsive high molecular gel.

In addition, the color materials such as dyes and pigments may be used singly or may be used as a mixture thereof for obtaining a desired color.

Practical examples of the suitable dyes include black Nigrosine-base dyes and azoic dyes, anthraquinone-base dyes, indigo-base dyes, phthalocyanine-base dyes, carbonium dyes, quinoneimine dyes, methine-dyes, quinolin dyes, nitro dyes, benzoquinone dyes, naohthoquinone dyes, naphthalimide dyes, belynon dyes, etc., which are color dyes of red, green, blue, cyan, magenta, yellow, etc., and the dyes having a high light absorption coefficient are particularly preferred.

Practical examples of these dyes include C.I. Direct Yellows 1, 8, 11, 12, 24, 26, 27, 28, 33, 39, 44, 50, 58, 85, 86, 87, 88, 89, 98, and 157; C. I. Acid Yellows 1, 3, 7, 11, 17, 19, 23, 25, 29, 38, 44, 79, 127, 144, and 245; C.I. Basic Yellows 1, 2, 11, and 34; C.I. Food Yellow 4; C.I. Reactive Yellow 37; C.I. Solvent Yellows 6, 9, 17, 31, 35, 100, 102, 103, and 105; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Acid Reds 1, 6, 8, 9, 13, 14, 18, 26, 27, 35, 37, 42, 52, 82, 85, 87, 89, 92, 97, 106, 111, 114, 115, 118, 134, 158, 186, 249, 254, and 289; C.I. Basic Reds 1, 2, 9, 12, 14, 17, 18, and 37; C.I. Food Red 14, C.I. Reactive Reds 23 and 180; C.I. Solvent Reds 5, 16, 17, 18, 19, 22, 23, 143, 145, 146, 149, 150, 151, 157, and 158; C.I. Direct Blues 1, 2, 6, 15, 22, 25, 41, 71, 76, 78, 86, 87, 90, 98, 163, 165, 199, and 202; C.I. Acid Blues 1, 7, 9, 22, 23, 25, 29, 40, 41, 43, 45, 78, 80, 82, 92, 93, 127, and 249; C.I. Basic Blues 1, 3, 5, 7, 9, 22, 24, 25, 26, 28, and 29; C.I. Food Blue 2; C.I. Solvent Blues 22, 63, 78, 83 to 86, 191, 194, 195, and 104; C.I. Direct Blacks 2, 7, 19, 22, 24, 32, 38, 51, 56, 63, 71, 74, 75, 77, 108, 154, 168, and 171; C.I. Acid Blacks 1, 2, 7, 24, 26, 29, 31, 44, 48, 50, 52, and 94; C.I. Basic Blacks 2 and 8; C.I. Food Blacks 1 and 2; C.I. Reactive Black 31; C.I. Food Violet 2; C.I. Solvent Violets 31, 33, and 37; C.I. Solvent Greens 24 and 25; C.I. Solvent Browns 3 and 9, etc.

The use of the dye of a structure having a polymerizable group such as an unsaturated double bond group, etc., or the so-called reactive dye which can be reacted with the above-described high molecular gel is preferred because the dye can be chemically fixed to the high molecular gel. Also, when a dye is used as the color material, the concentration of the dye contained in the high molecular gel is preferably from 3% by weight to 50% by weight, and more preferably from 5% by weight to 30% by weight. Also, it is desirable that the concentration of the dye is at least the saturated absorption concentration in at least the dried or shrunk state of the high molecular gel. In this case, the term "at least the saturated absorption concentration" means the region of a high dye concentration such that the relation of the dye concentration and an optical density (or a light-absorption amount) in a specific optical path length is largely separated from the primary straight line.

On the other hand, as practical examples of the above-described pigment, there are black pigments such as a bronze powder and various carbon blacks (channel black, furnace black, etc.), white pigments such as titanium oxide, etc., color pigments such as phthalocyanine-base cyan dyes, benzidine-base yellow pigments, rhodamine-base magenta pigments, and other pigments of anthraquinone-base, azo-base, azo metal complex-base, phthalocyanine-base, quinacridone-base, perylene-base, indigo-base, isoindolinone-base, allylamide-base, etc.

As the yellow-series pigment, condensed azo compounds, isoindolinone compounds, anthraquinone compounds, azo metal complexes, methine compounds, allylamide compounds, etc., are typically used. More specifically, C.I. Pigment Yellows 12, 13, 14, 15, 17, 62, 74, 83, 93, 94, 95, 109, 110, 111, 128, 129, 147, 168, etc., are suitably used.

Also, as the magenta-series pigments, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds are used. More specifically, C.I. Pigment Reds 2, 3, 5, 6, 7, 23, 48:2, 48:3, 48:4, 57:1, 81:1, 144, 146, 166, 169, 177, 184, 185, 202, 206, 220, 221, and 254 are particularly preferred.

As the cyan-series pigments, copper phthalocyanine compounds and the derivatives thereof, anthraquinone compounds, basic dye lake compounds, etc., can be utilized. Practically, C.I. Pigment Blues 1, 7, 15, 15:1, 15:2, 15:3, 15:4, 60, 62, 66, etc., can be particularly suitably used.

As the particle sizes of the pigment used as the color material, the average particle size of the primary particles is preferably from 0.001 μm to 1 μm, and particularly preferably from 0.01 μm to 0.5 μm. When the average particle size of the pigment is smaller than 0.001 μm, the pigment is liable to be flowed out from the high molecular gel, while the average particle size exceeds 1 μm, there is a tendency lowering the coloring characteristics.

When the pigment is used as the color material, it is preferred that the pigment is contained in the high molecular gel at a concentration of at least the saturated absorption concentration as in the case of using the dye described above. In this case, the term "at least the saturated absorption concentration" shows the region of a high pigment concentration such that the relation of the pigment concentration and an optical density (or a light-absorption amount) in a specific optical path length is largely separated from the primary straight line. The content of pigment necessary of making the concentration thereof at least the saturated absorption concentration differs according to the light absorption coefficient of the pigment used but, in general, the concentration of the pigment in the above-described high molecular gel is preferably from 3% by weight to 90% by weight, and more preferably from 5% by weight to 80% by weight. When the pigment concentration is lower than 3% by weight, the concentration of the pigment does not become at least the saturated absorption concentration and the change of color density by the volume change of the color material is hard to occur. By thickening the thickness of the color filter layer, the contrast can be increased but thereby there occur problems that the responding speed is lowered, etc. On the other hand, when the concentration of pigment exceeds 90% by weight, the stimulus responsive characteristics and the amount of the volume change of the high molecular gel tend to lower.

To prevent the color material from flowing out from the high molecular gel, it is effective to physically confine the color material to the high molecular network by optimizing the crosslinking density of the high molecular gel, to use a color material having an electric, ionic, or physical interaction with the high molecular gel, or to use a color material the surface of which is subjected to a chemical modification. As the color material the surface of which is subjected to a chemical modification, there are, for example, the pigment wherein an unsaturated group such as a vinyl group, etc., or a group causing chemical bonding with the high molecular gel, such as an unpaired electron (radical), etc., is introduced into the surface thereof, the pigment grafted with a high molecular material, etc.

The above-described high molecular gel can be produced by a method of grinding by a physical grinding method, a method of, after forming particles of a high molecule before crosslinking by a physical grinding method or a chemical grinding method, crosslinking the particles formed to form a gel, or a particle-forming polymerization method such as an emulsion polymerization method, a suspension polymerization method, a dispersion polymerization method, etc.

As a method of incorporating the color material in the high molecular gel, a method of uniformly dispersing the color material in a high molecule before forming the crosslinked structure and, thereafter, crosslinking the high molecule to obtain the high molecular gel containing the color material, and a method of adding the color material to the high molecule precursor monomer composition at polymerization, and thereafter, polymerizing the monomer composition to obtain the high molecular gel containing the color material are preferred. In the case of adding the color material at the polymerization, it is preferred to use a color material having a polymerizing group or an unpaired electron (radical) to chemically bond the color material with the high molecule. Also, it is preferred that the color material is uniformly dispersed in the high molecular gel, and particularly, in the case of dispersing the color material in a high molecule, it is desirable that the color material is uniformly dispersed using a mechanical kneading method, a stirring method, or a dispersing agent, etc.

Also, it is preferred to make the high molecular gel porous, because in this case, the absorption of the liquid to the high molecular gel and the release of the liquid from the high molecular gel can be accelerated to improve the responding speed. As a method of forming the porous high molecular gel, there is, for example, a method of forming a swelled state of the high molecular gel containing a pigment by absorbing a liquid into the high molecular gel and lyophilizing the swelled high molecular gel.

Furthermore, a light-scattering member may be fixed to the surfaces of the high molecular gel particles. By fixing the light-scattering member to the surface, a color filter and a display element capable of displaying color images having a higher contrast can be provided. About the stimulus responsive high molecular gel having fixed to the surface thereof a light-scattering member, the details are described in the specification of Japanese Patent Application No. 190409/1998.

It is preferred that the liquid disposed in contact with the high molecular gel is a liquid having a function capable of swelling the high molecular gel by being adsorbed by the high molecular gel and also shrinking the high molecular gel by being released from the high molecular gel. Practically, as the liquid, water, an aqueous solution of an electrolyte, alcohols such as methanol, ethanol, propyl alcohol, butyl alcohol, etc.; ketones such as acetone, methyl ethyl ketone, etc.; ethers, esters, dimethylformamide, dimethyl acetoamide, dimethyl sulfoxide, acetonitrile, propylene carbonate, aliphatic or aromatic organic solvents, etc., and the mixtures of them can be used. Also, the liquid may contain a surface active agent of being adsorbed to or desorbed from the high molecular gel, an oxidation-reduction agent such as a viologen derivative, etc., for accelerating the pH change of the liquid, an acid, an alkali, a salt, a dispersion stabilizer, a stabilizer such as an oxidation preventing agent, a ultraviolet absorbent, etc.

The mixing ratio of the high molecular gel and the liquid is preferably from 1:2000 to 1:1 by weight ratio (high molecular gel:liquid).

Also, it is preferred to use the high molecular gel and the liquid by encapsulating them in microcapsules from the view points of enlarging the utilization range and improving the characteristics.

As the substrate for the color filter and the display element of the invention, the high molecular films and planar substrates of polyester, polyimide, polymethyl methacrylate, polystyrene, polypropylene, polyethylene, nylon, polyvinyl chloride, polyvinylidene chloride, polycarbonate, cellulose derivatives, etc., a glass substrate, a metal substrate, a ceramic substrate, etc., can be used. In addition, according to the construction of the element, it is preferred that the substrate is optically transparent and particularly, in the case of a transmission type display element, it is preferred that all the substrates are transparent. There is no particular restriction on the thickness of the substrate but generally, the thickness is preferably from 20 $\mu$m to 2 cm.

In the invention, it is preferred that the color filter or the display element (the construction equipped with the dimming element utilizing a black high molecular gel) has in the inside thereof a stimulus-imparting unit imparting a stimulus to the stimulus responsive high molecular gel because the construction becomes simple. The stimulus imparting unit has a function of imparting a stimulus to the high molecular gel to reversibly change the volume thereof. Particularly, the stimulus imparting to the high molecular gel is preferable an electric, thermal, or optical stimulus because the control of the impart of stimulus becomes easy.

By the electric stimulus, the stimulus responsive high molecular gel particles respond by the response of electric field, an oxidation reduction reaction, the absorption or desorption by the migration of a chemical substance, or the construction of forming a metal layer of, typically, copper, aluminum, silver, platinum, etc.; a metal oxide layer such as, typically, a tin oxide-indium oxide (ITO) layer; an electrically conductive polymer layer of, typically, polypyrroles, polythiophenes, polyanilins, polyphenylenevinylenes, polyacenes, polyacetylenes, etc.; an electrode layer such as a composite material layer of a polymer and the particles of the metal or the metal oxide described above, at both surfaces of a substrate and applying a voltage between the electrode layers in response to an image signal is preferred. Also, it is preferably practiced to combine the above-described electrode layers with switching element such as a TFT (thin-film transistor) element, an MIM (metal/insulator/metal) element, etc., and to form wiring connected to the electrode layers.

In addition, in the case of using a liquid crystal dimming element, electrode layers for driving the liquid crystal dimming element become necessary as the case of the stimulus-imparting unit and as the material for the electrode layers, the same materials as described above can be used.

It is preferred that the electrode layers constituting the stimulus-imparting unit are segmented and the colored regions or the dimming regions are formed corresponding to the segmented electrode layers. Such a construction is preferred because in this case, a stimulus can be selectively and segmented electrode layers. Such a construction is preferred because in this case, a stimulus can be selectively and separately imparted to the optional colored regions (pixels) and the optional dimming regions. The area and the form of the segmented electrode layer differ according to the use and the desired resolving degree but in the use of a small-sized display such as a general PC, etc., a square having one edge of from 50 $\mu$m to 500 $\mu$m and stripes having a width of from 50 $\mu$m to 500 $\mu$m are preferred. Also, in the use of a large-area display, the form may be larger segments. It is preferred that the thickness of the electrode layer formed on the substrate is generally from 1 nm to 50 $\mu$m.

As the stimulus-imparting unit of imparting a thermal stimulus to the high molecular gel, a construction of forming a metal layer of, typically, an Ni—Cr compound, etc., a metal oxide layer of tantalum oxide, ITO, etc., or an exothermic resistant layer such as a carbon layer, etc., at both surfaces of a substrate, connecting wiring to the exothermic resistant layer using the above-described electrode material, and supplying a voltage to the exothermic resistant layer according to an image signal is preferred. Also, it is preferred that the exothermic resistant layer is segmented corresponding to the colored regions and the dimming regions as in the case of the above-described electrode layer.

As the stimulus-imparting unit imparting an optical stimulus to the high molecular gel, it is preferred to use a light-emitting element layers of a laser, LED, EL, etc. In addition, in the case of imparting an optical stimulus, the light-emitting layer may be formed in the inside of the display element (including the insides of the color filter and the dimming element) but it is also preferred to form a light-emitting driving element or unit at the outside of the element. In the case of forming the light-emitting layer, it is preferred that the light-emitting layer is segmented corresponding to the colored regions and the dimming regions as in the case of the above-described electrode layer.

As other stimulus-imparting unit, a layer giving a magnetic field or an electromagnetic wave to the high molecular gel may be formed on the substrate.

In the case of applying the color filter and the display element of the invention to a light-reflecting type display element, it is preferred to form a light-reflecting unit. As the light-reflecting unit, films of various metals, metal oxides, metal compounds, etc., such as aluminum, chromium, magnesium oxide, barium carbonate, nickel, gold, silver, platinum, etc., or the films of the mixture of them can be used. Also, the light-reflecting unit may be used together with the electrode layer, the exothermic resistant layer, the light-emitting layer, etc., constituting the above-described stimulus-imparting unit. In addition, the light-reflecting layer may be directly formed on the substrate of the color filter or the dimming element or may be separately formed.

In the case of applying the color filter and the display element of the invention to a transmission type display element, it is preferred to form a back light. As the back light, those used for liquid crystal display elements, such as a cold cathode ray tube, a fluorescent tube, LED, EL, etc., an element formed by combining thereof with a light guide or a light diffusing material, etc., can be widely utilized.

In addition, the detailed explanations about the reflection prevention, the antistatic method, the black matrix, and other members are omitted but for these materials, various materials as used in techniques of prior art can be used.

Then, the preparation examples of the color filter and the display element of the invention are described.

As a preparation example of the color filter, the preparation example of the case of using electric stimulus responsive colored high molecular gels (three colors of R, G, and B) and a substrate having formed thereon an electrode layer as the stimulus-imparting unit is illustrated.

First, an electrode layer is formed on the surface of the substrate by an etching treatment, etc. For example, in the case of segment driving, specific electrode segments are formed on the substrate, in the case of passive driving, striped electrodes are formed, and in the case of active driving of TFT, etc., a TFT element and segmented electrodes are formed on at least one surface of the substrate.

Then, the colored high molecular gels of R, G, and B are disposed at definite places, respectively, to form the colored regions R, G, and B. As a method of disposing the above-described colored high molecular gels at the definite places, there is, for example, a method of fixing the colored high molecular gels onto the substrate or the electrode. In particular, it is preferred that the colored high molecular gels are fixed onto the electrode formed as described above because, in this case, an electric stimulus can be selectively imparted to the colored high molecular gels. For example, as a method of using the colored high molecular gel particles and fixing these particles onto the substrate or the electrode, a chemical method of utilizing various bi-functional compounds or an adhesive or a physical method can be used. As the chemical method, there is, for example, a method of previously treating the surface of the substrate or the electrode using a reactive silane coupling agent to introduce thereto a functional group and reacting the functional group and the functional groups of the above-described high molecular gel particles, whereby covalent bonds are formed to fix the gel particles onto the substrate or the electrode. As other method, there is a method of fixing the gel particles using a multifunctional compound or an adhesive.

Also, as the physical method, there are a method of sterically working the surface of the substrate or the electrode and fixing the gel particles into the concaved portions, etc., formed on the surface of the substrate or the electrode and a method of confining the gel particles in the specific sections of a cell structure. Also, it is preferred that the surface of the substrate, etc., is sterically worked to form convex portions and the gel particles are bonded to the convex portions or the gel particles are fixed onto the substrate, etc., via a long-chain compound (spacer), high molecular fibers, metal fibers. etc., because in this case, some space can be formed between the gel particles and the substrate, etc., whereby the gel particles can be fixed to the definite places without lowering the stimulus responsive characteristics of the gel particles. Moreover, it is preferably practiced to encapsulate the gel particles and the liquid in microcapsules and fix the microcapsules.

For bonding (fixing) the stimulus responsive high molecular gel particles of R, G, and B to different places on the substrate, etc., respectively, to form colored regions, for example, a method of coating a composition containing each gel particles on the desired places of the substrate, etc., by printing, etc., followed by causing a reaction, a method of successively forming each gel particles of each color by a masking method, etc., and bonding the gel particles, etc., can be utilized. For disposing the pixels of each color, various methods can be applied but generally, it is preferred that the gel particles of each color are disposed with a specific regularity. For example, there is a construction of disposing the gel particles of specific color in stripe form.

Figure 20:
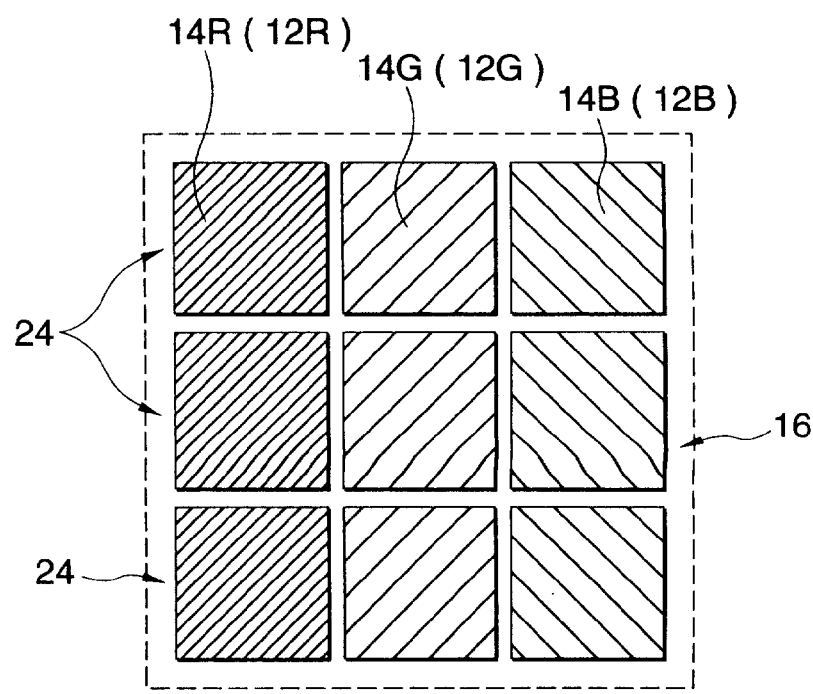
FIG. 20 is a plain view showing an embodiment of a color filter.

FIG. 20 is a plain view of a color filter wherein colored regions 14R, colored regions 14G and colored regions 14B each having a same area are disposed with a same interval on a segment electrode layer 24 formed on the surface of a substrate. When the colored region 14R, the colored region 14G, and the colored region 14B are disposed as shown in FIG. 20, the colored regions can become pixels in the color filter and the display element.

The colored high molecular gel particles constituting the colored region (pixel) may be one particle or many particles. Because the responsive property of the colored high molecular gel particles is more excellent as the particle size is smaller, it is preferred to form the pixel with plural colored high molecule gel particles of small particle sizes. Also, it is preferred that when the colored high molecular gel particles are swelled, the spaces among the particles are less. Also, it is preferred that the colored high molecular gel particles are fixed onto the substrate, etc., as one particle layer in the point of obtaining a high dimming function.

Then, the substrate having fixed on the surface thereof the colored high molecular gel particles faces other substrate with a specific interval between them and they are stuck to each other. It is preferred that the interval of a pair of substrates facing each other is from 1 $\mu$m to 5 mm. Particularly, in a small-sized display element, it is preferred that the above-described interval is from 10 $\mu$m to 200 $\mu$m. When the interval is shorter than 1 $\mu$m, the coloring density becomes low and a desired contrast cannot be obtained, while the interval exceeds 5 mm, the element becomes heavy, which sometimes cause a problem for practical use. To make the interval of a pair of substrates a definite value, a method of scattering spacer particles of various sizes between the substrates, a method of using a film spacer, a method of utilizing a steric structural material, etc., formed on the substrate, etc., are preferably practiced.

Also, the spacer may be a cell structure partitioning the gel particles. Furthermore, the spacer may be also used as a black matrix.

In the case of sticking two substrates to each other, it is preferred to seal the peripheral portions except a specific open portion with an adhesive, a ultraviolet curing resin, or a thermosetting resin.

Then, a liquid is injected in the space between the substrates from the above-described open portion by a vacuum injection method and thereafter, the open portion is sealed to obtain a color filter.

The dimming element utilizing the black stimulus responsive high molecular gel can be prepared by the same preparation method as the color filter described above. Because the color filter and the dimming element are laminated each other, the substrate can be used for both members. In the case of the construction of using the same substrate for both the members, it is preferred that a stimulus-imparting layer such as an electrode layer, etc., is formed on both the surfaces of the substrate. Also, it is preferred that the dimming regions of the dimming element formed by the black high molecular gel are disposed with the size and at each pixel of the color filter or are constructed capable of being dimmed corresponding to each pixel.

In the case of preparing a color display element utilizing the liquid crystal dimming element, the color filter prepared as described above is laminated with the liquid crystal dimming element. In the construction, the color filter and the liquid crystal dimming element can used as same substrate. The liquid crystal dimming element can be prepared by a general method of injecting a liquid crystal in the space between a pair of substrates having a stimulus-imparting unit.

As a practical example, a preparation example of the liquid crystal dimming element using a TN liquid crystal or an STN liquid crystal is explained below.

First, an oriented film is formed on a substrate equipped with an electrode and the substrate having the oriented film is subjected to a rubbing treatment to a desired direction. After scattering spacer particles having a definite size on the substrate, a pair of substrates are stuck to each other, and the periphery thereof is sealed with a resin, etc., leaving an inlet of a liquid crystal. Thereafter, after injecting a liquid crystal by a vacuum injection method, the open portion is sealed to obtain a liquid crystal cell. Furthermore, in a reflection type display element, at least one polarized plate is, and in a transmission type display element, a pair of polarized plates are formed adjacent to the liquid crystal layer. Also, it is preferably practiced to form various optical compensation plates and phase difference plates.

Furthermore, it is also preferred to use a GH liquid crystal display element and in this case, the polarized plate(s) become unnecessary. The thickness and the material of the liquid crystal dimming layer can be selected in general ranges same as in the techniques of prior art.

The display device of the present invention is a display device having the color filter of the invention, the dimming element of dimming the incident light to the color filter, a 1st unit of changing the light transmittance of the color filter according to an input image information, and a 2nd unit of changing the light transmittance of the dimming element according to the above-described image information. The 1st unit has a function of controlling a stimulus-imparting unit (a unit of imparting a stimulus to the stimulus responsive colored high molecular gels) formed at the inside or the outside of the color filter, selectively imparting a stimulus to the stimulus responsive colored high molecular gels, and changing the light transmittance of the color filter according to the input image signal. For example, when the stimulus-imparting unit is composed of segmented electrode layers on the substrate, the 1st unit has a function of controlling passing of an electric current to the electrode layer according to the image signal. On the other hand, the 2nd unit has a function of changing the light transmittance of the dimming element by driving the dimming element according to the input image signal. When the above-described dimming element is an embodiment of utilizing the black stimulus responsive high molecular gels, the 2nd unit has a function of controlling the stimulus-imparting unit (a unit of imparting a stimulus to the black stimulus responsive high molecular gels) formed at the inside or the outside of the display element, selectively imparting a stimulus to the stimulus responsive colored high molecular gels, and changing the light transmittance of the color filter according to the input image signal. For example, when the stimulus-imparting unit is composed of the segmented electrode layers on the substrate of the dimming layer, the 2nd unit has a function of controlling passing of an electric current to the electrode layer according to the image signal.

Then, the invention is described in detail by the following examples but the scope of the invention is not limited by the examples.

Preparation example 1 of stimulus responsive high molecular gel particles:

High molecular gel particles (black, R, G, and B) responsive to pH are prepared as follows.

By mixing 10 g of carbon black having a primary particle size of about 0.1 μm ("Show Black", manufactured by Showa Cabot Corporation; hereinafter, carbon black is referred to as "CB") and 50 ml of distilled water added with 0.3 g of a surface active agent "Emulgen 909" (manufactured by Kao Corporation), the mixture is uniformly dispersed using a ultrasonic dispersing apparatus to prepare a dispersion. Then, 10 g of acrylic acid as a monomer and 0.02 g of methylenebisacrylamide as a crosslinking agent are dissolved in 20 ml of distilled water and the solution is mixed with 6 g of sodium hydroxide to prepare a neutralized aqueous monomer solution. The aqueous solution is mixed with the CB dispersion prepared above, the mixture is placed in a flask, and after degassing, the inside atmosphere is replaced with a nitrogen gas.

To the monomer mixture is added 0.2 g of ammonium persulfate as a polymerization initiator, the mixture is added to 200 ml of cyclohexane as a dispersion medium, the mixture is placed in a nitrogen-purged container, and emulsified by stirring at high speed by a homogenizer. Furthermore, 0.1 ml of tetraetylethylenediamine is added to the emulsion as a polymerization accelerator and the polymerization is carried out for 5 hours at 30° C. The black particles formed by the polymerization are added to a large amount of distilled water and the mixture is purified by repeating filtration. Thereafter, the mixture is dehydrated using a large amount of methanol followed by drying. By classifying the crude particles of a high molecular gel obtained, black high molecular gel particles having a dry average particle size of 10 μm are obtained.

The water absorption of the black high molecular gel particles in an aqueous solution of 0.01 N sodium hydroxide is about 150 g/g. Also, the black high molecular gel particles can be reversibly swelled and shrunk by changing the pH thereof and show the characteristics of reversibly causing the changes of the particle size of about 3 times and the volume of about 30 times between the pH 3.0 (shrinking) to the pH 12 (swelling).

In the above-described preparation of the black high molecular gel particles, by following the same procedure except that CB used is changed to each of the pigments of red (R), green (G), and blue (B) (manufactured by DAIN-ICHISEIKA COLOR & CHEMICALS MFG. CO., LTD.), high molecularcolored gels of three colors of R, G, and B are obtained, respectively. The properties of the colored high molecular gels obtained are almost same as those of the above-described black high molecular gel particles.

Preparation example 2 of stimulus responsive high molecular gel particles:

Then, heat-responsive high molecular gel particles (black, R, G, and B) are prepared as follows.

In 50 ml of distilled water are dissolved 9.8 g of N-isopropylacrylamide, 0.2 g of sodium acrylate, and 0.05 g of methylenebisacrylamide, 20 ml of an aqueous dispersion of CB having a primary particle size of about 0.1 μm (solid component 15%, "Cabojet 300", manufactured by Showa Cabot Corporation) is added to the solution, and after degassing the dispersion and replacing the inside atmosphere with nitrogen, 0.1 g of ammonium persulfate is added thereto to prepare an aqueous monomer solution containing CB. Then, a solution prepared by dissolving 2.0 g of a sorbitol-base surface active agent ("Solgen 50", manufactured by DAIICHI KOGYO SEIYAKU. CO., LTD.) in 300 ml of cyclohexane is placed in a flask followed by degassing and replacing with nitrogen, the aqueous monomer solution containing CB prepared above is added to the solution, and the mixture is emulsified using a rotary stirring blade at high speed.

After the emulsification, the temperature of the reaction system is adjusted to 10° C., while stirring the emulsion, 1 ml of an aqueous solution of 50% tetramethylethylenediamine is added thereto, and the polymerization is carried out. After the polymerization, black particles formed are recovered and after purifying by washing with pure water, are dried. By classifying the black particles, black high molecular gel particles having an average particle size of about 10 µm are obtained.

The pure water absorption of the particles at 20° C. is about 38 g/g. When the gel particles are heated after being swelled with water, the gel particles are shrunk with a phase transition point at about 36° C. That is, the gel particles are shrunk at a high-temperature side from the phase transition point, swelled at a low-temperature side, and the change is reversible. Also, by swelling and shrinking, the gel particles are changed to about 2.5 times in the particle size and to about 16 times in the volume.

In the above-described preparation of the black high molecular gel particles, by following the same method except that CB used is changed to the pigments of red (R), green (G) and blue (B), respectively, (solid component is same as "Cabojet 300", and "Emulgen 909" used as the dispersing agent in the preparation example 1 is used similarly), each of high molecular colored gel particles of three colors of R, G, B is obtained, respectively. The properties of the high molecular gel particles obtained are almost same as those of the above-described black high molecular gel particles.

EXAMPLE 1

Using the pH-responsive colored high molecular gel particles prepared in the preparation example 1 described above, color filters of the three primary colors of R, G, and B, respectively, are prepared as follows.

Figure 21:
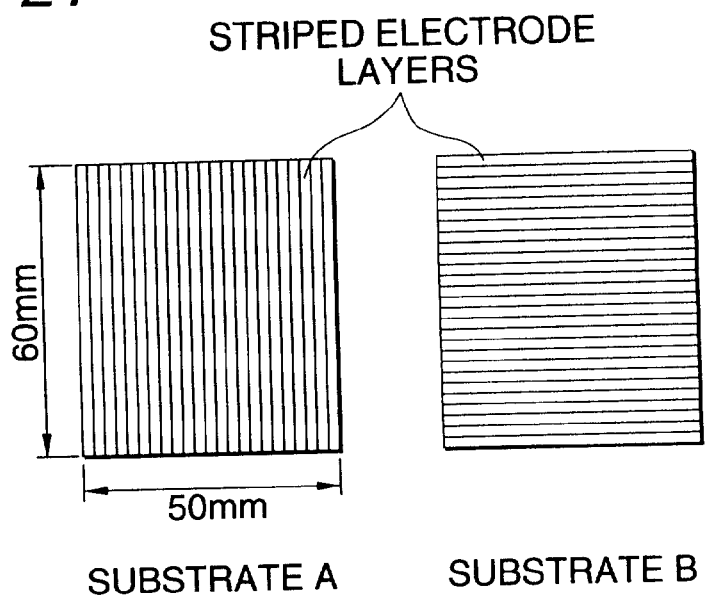
FIG. 21 is a plain view of the substrate used in the example.

Using a glass substrate (thickness 1.5 mm, 50 mm×60 mm) having formed thereon ITO (indium-tin oxides) as a transparent electrically conductive electrode, by etching the electrode using a lithographic method, striped electrode layers having a width of each electrode of 0.5 mm and an interval between adjacent electrodes of 0.1 mm are formed. In the example, two kinds of substrate A and substrate B wherein the lengthwise direction of the striped electrode layers formed each of the substrates is in the width direction in one substrate and in the lengthwise direction in the other substrate, are prepared (FIG. 21). Then, the striped electrode layers of the substrate A are coated with a solution of a silane coupling agent (3-glycidoxypropyltrimethoxysilane) by a masking method, and after causing a reaction by heating, the layers are washed to form the bonding agent layers for fixing the colored high molecular gel particles onto the electrode layers.

Figure 22:
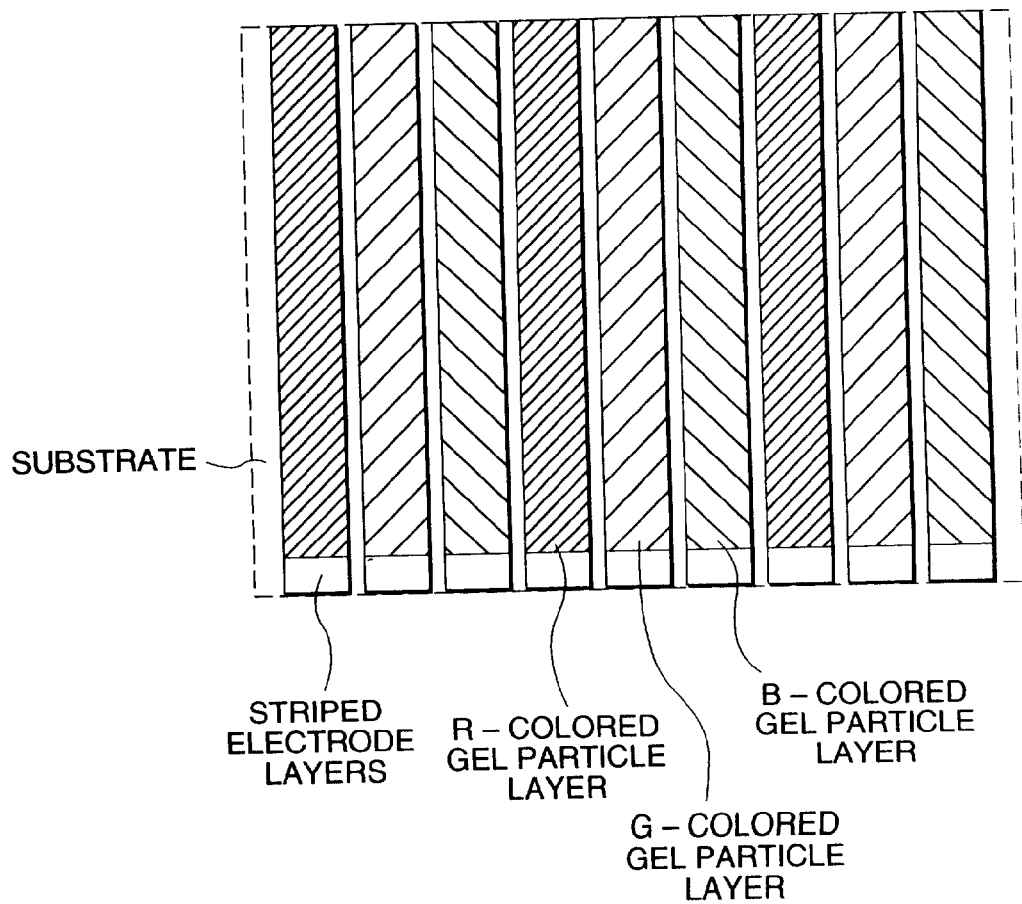
FIG. 22 is a plain view of the color filter prepared in the example.

Then, each of paste solutions each made of the high molecular gel particles of three colors of R, G, or B prepared in the preparation example 1 and water is prepared and coated on each of the definite striped electrode layers on the substrate A by a screen printing method and heated, whereby the reactive silane coupling agent and the high molecular gel particles are subjected to a chemical reaction to fix each colored high molecular gel particles to definite places. Thus, the disposition of successively arranging repeatedly the units of R, G, and B is prepared (FIG. 22). Thereafter, the substrate is washed with pure water to remove excessive gel particles not bonded onto the substrate. When the surface of the substrate is microscopically observed, the colored high molecular gel particles are almost uniformly disposed on the striped electrodes.

Then, after scattering resin spacer particles having an average particle size of 100 µm on the surface of the substrate B, a ultraviolet curing resin is coated at the peripheral portion of the substrate except opening portion, the substrate B is stuck to the above-described substrate A having fixed thereon the high molecular gel particles, and adhered by irradiating the coated portion by ultraviolet rays. In addition, in this case, the substrate A and the substrate B are stuck to each other so that the striped electrodes formed on the substrates A and B face each other and are crossed to each other at a right angle to provide a simple matrix driving cell. Then, after injecting an aqueous solution of 0.01 N sodium hydroxide as a liquid for swelling the high molecular gel particles in the inside of the cell by a vacuum injection method, the open portion is sealed to prepare a color filter. Then, the electrode layer of the side of the substrate A having fixed thereof the high molecular gel particles is used as an anode, the ends of the striped electrodes are connected to an electric source capable of passing a D.C. electric current of 5 volts.

By selecting the striped electrodes of the substrates A and B corresponding to an X axis and a Y axis, an electric current is passed to specific pixels and the change of the light transmittance of the color filter is measured.

Because in the sample before passing the electric current, all the gel particles are in a swelled state, the incident light into the color filter is adsorbed by the pixel portions, whereby the amount of the transmitted light is about 25% and the transmitted light is a white color. On the other hand, when the electric current is passed to all the pixels, the pH of the surfaces of the electrodes is lowered and the gel particles are shrunk, and as the result thereof, the amount of the transmitted light of the color filter is increased to about 80% and the transmitted light becomes a bright white color. When passing of the electric current is stopped again, after about 30 milliseconds, the amount of the transmitted light is returned to the original amount. Furthermore, when the electric current is passed to other pixels than the R pixels, the transmitted light is changed to a red color. Similarly, by passing the electric current to specifically selected pixels, the transmitted light can be changed to various colors. In addition, it is confirmed from a microscopic observation that the volumes of the colored high molecular gel particles are reversibly changed in the range of about 30 times by passing the electric current.

As described above, in the color filter of Example 1, the hue of the transmitted light can be variously changed and also the amount of the transmitted light can be changed as well as the color filter is confirmed to be able to display a bright color.

EXAMPLE 2

A color filter is prepared by the same process as in Example 1. In this case, however, as a substrate A' having fixed thereof color gel particles, a substrate having further formed striped electrode layers on the back surface, said striped electrodes being crossed at a right angle to the striped electrodes on the front surface thereof (the surface having fixed thereto the color gel particles) is used.

Also, a substrate same as the substrate A having formed thereon the striped electrode layers used in Example 1 is used and the black high molecular gel particles prepared in Example 1 are fixed onto all the electrode layers by the same method as in Example 1. Then, the substrate having fixed thereto the black gel particles is stuck to the above-described color filter by the same method as in Example 1 via resin spacer particles having a particle size of 100 µm so that the pixels of the substrate overlap the cells of the color filter, and after injecting an aqueous solution of 0.01 N sodium hydroxide by a vacuum injection method, the open portion is sealed to prepare a color display element. In addition, in this case, the substrates each having formed thereon striped electrode layers are stuck to each other so that the striped electrode layers on the substrates face each other and also the striped electrodes of the substrates are crossed to each other at a right angle.

Because in the color display element obtained, all the gel particles are in a swelled state before passing an electric current, the incident light is mostly absorbed and the amount of the transmitted light is about 0.8% and is a black display. On the other hand, when an electric current is passed to the dimming layer and all the pixels of the color filter, the high molecular gel particles are shrunk to transmit a light, the amount of the transmitted light becomes about 65% and becomes a white display. When passing of the electric current is stopped again, the display is instantly returned to the original black display.

Then, when the electric current is passed to only the regions of the dimming layer disposed under the R pixels, the transmitted light is changed to a red light. Similarly, by passing the electric current to the dimming layer of the regions only corresponding to the G pixels and the B pixels, the transmitted light is changed to a green color or a blue color, respectively. Furthermore, by passing the electric current to the dimming layer of the regions only corresponding to color pixels of two colors, a mixed color can be displayed. For example, by passing the electric current to the dimming layer of the selected regions only corresponding to two colors of the R pixels and the G pixels, the display of a yellow color (Y) can be realized. Similarly, by selecting other two colors of pixels, each color of, for example, a cyan color (C) or a magenta color (M) can be displayed.

Furthermore, the luminance of a single color can be variously controlled. For example, by passing the electric current to other all pixels than the R pixels of the color filter layer, more bright red than the above-described red can be displayed. As described above, by passing an electric current by combining the color filter and each pixels of the dimming layer, the colors having various color tones can be displayed.

Also, when a diffusion reflection plate made of MgO is disposed at the background of the color display element, it is confirmed that a bright reflection type display having the reflectance of the white display of at least 50% becomes possible. On the other hand, it is also confirmed that when a back light is disposed, a more bright and clear display can be realized. Also, a clear image can be confirmed at a wide angle of vision near almost 180°.

As described above, it is confirmed that the color display element of Example 2 can realize the bright and color tone-enriched display having a wide angle of vision.

EXAMPLE 3

Using the heat-responsive colored high molecular gel particles prepared in above-described Preparation Example 2, a color filter made of the three primary colors of R, G, and B is prepared as follows.

An ITO layer having an optimized resistant value is formed as transparent exothermic resistant on a glass substrate (thickness 1.5 mm, 30 mm×30 mm) as a substrate and by etching treating the ITO layer by the same method as used in Example 1, striped exothermic resistant layers having a width of 1 mm and an interval between the adjacent striped electrodes of 0.2 mm are formed thereon. In addition, in the construction, by connecting an electric source to both ends of each of the striped exothermic resistant layers, and by passing a pulse-form electric current, the exothermic resistant layers can be heated to a desired temperature. Furthermore, as in Example 1, a substrate A having formed the striped exothermic resistant layers in the lengthwise direction and a substrate B having formed the striped exothermic resistant layers in the width direction are prepared.

Then, each of the heat-responsive high molecular gel particles of three colors of R, G, and B prepared in Preparation Example 2 described above is fixed onto the above-described striped exothermic resistant layers by the same process as in Example 1. In addition, each of the heat-responsive high molecular gel particles of three colors of R, G, and B is regularly disposed as in Example 1. Furthermore, as a counter substrate, a similar glass substrate is used, and the two substrates described above are stuck to each other as in Example 1 to prepare a cell, and after injecting therein pure water as a swelling liquid, the open portion is sealed to prepare a color filter.

Then, by selectively passing an electric current to specific striped exothermic resistant layers, specific pixels only are heated and the change of the light transmittance is observed.

Because before passing the electric current, all the colored high molecular gel particles are in a swelled state, the incident light is absorbed, the amount of the transmitted light is about 25% and the transmitted light is a white color. On the other hand, when the electric current is passed to all the pixels, the surface temperature of the exothermic resistant layers is increased to shrink the gel particles, whereby the incident light is transmitted and the amount of the transmitted light is increased to about 75%. However, when passing of the electric current is stopped, the amount of the transmitted light is returned to the original amount in about 100 milliseconds. Furthermore, when the electric current is passed to other pixels than the R pixels, the transmitted light is changed to a red color. Similarly, by selectively passing the electric current to the pixels of a specific color, the transmitted light can be changed to various colors. In addition, from a microscopic observation, it is confirmed that by passing an electric current, the volume of the colored high molecular gel particles is reversibly changed in the range of about 15 times.

As described above, it can be confirmed that the color filter of Example 3 is a color filter capable of variously changing the hue of the transmitted light, capable of changing the amount of the transmitted light, and capable of making a bright color display.

EXAMPLE 4

A color filter is prepared by the same process as in Example 3.

Using a substrate having striped exothermic resistant layers same as the substrate prepared in Example 3, the heat-responsive black gel particles prepared in Preparation Example 2 are fixed onto all the exothermic resistant layers by the same method as in Example 1.

The color filter described above is stuck to the substrate having fixed thereto the black gel particles via resin space particles having a particle size of 100 μm by the same method as Example 2 and Example 3 so that the cells of the color filter overlap the cells of the dimming layer of the substrate, and after injecting pure water as a liquid, the open portion is sealed to prepare a color display element.

Because before passing an electric current, all the gel particles are in a swelled state, an incident light is almost absorbed by the gel particles, the amount of the transmitted light is about 0.8% and the display element shows a black display. On the other hand, when an electric current is passed to all the pixels of the color filter and the dimming layer, the high molecular gel particles are shrunk, the light is transmitted, the amount of the transmitted light becomes about 60%, and a white display can be realized. When passing of the electric current is stopped, the display is instantly returned to the original black display. Then, when the electric current is passed to the dimming layer of the regions only placed under the R pixels, the transmitted light is changed to a red color. Similarly, when the electric current is passed to the dimming layer of the specific regions only corresponding to the G pixels or the B pixels, the transmitted light can be changed to a green color or a blue color, respectively. Furthermore, by passing the electric current to the dimming layer of the specific regions only corresponding to color pixels of two colors, a mixed color can be displayed. For example, when the electric current is selectively passed to the dimming layer of the regions corresponding to the two color pixels of R and G, the display of a yellow color (Y) can be realized. Similarly, by selecting other two colors, each color of cyan (C) and magenta (M) can be displayed.

Furthermore, the luminance of a single color can be variously controlled. For example, by passing the electric current to other all pixels than the R pixels of the color filter layer, more bright red than the above-described red can be displayed. As described above, by passing an electric current by combining the color filter and each pixels of the dimming layer, the colors having various color tones can be displayed.

Also, when a diffusion reflection plate made of MgO is disposed at the background of the color display element, it is confirmed that a bright reflection type display having the reflectance of the white display of at least 50% becomes possible. On the other hand, it is also confirmed that when a back light is disposed, a more bright and clear display can be realized. Also, a clear image can be confirmed at a wide angle of vision near almost 180°.

As described above, it is confirmed that the color display element of Example 4 can realize the bright and color tone-enriched display having a wide angle of vision.

EXAMPLE 5

A color display element formed by laminating the color filter prepared in Example 1 and a dimming layer made of a liquid crystal is prepared.

The liquid crystal dimming layer is prepared by a general process shown below using a TN liquid crystal.

Two substrates A and B each having formed thereon striped electrode layers prepared as in Example 1 are used, an oriented film of polyimide is formed on the striped electrode layers, and is subjected to a rubbing treatment. The two substrates are similarly stuck to each other via spacer particles having a particle size of 10 μm as in Example 1 to prepare a cell. In addition, the substrates are disposed so that the rubbing direction and the direction of the striped electrodes of the each substrate are crossed to each other at a right angle. Then, after injecting therein a TN crystal liquid (manufactured by Merck & Co., Inc.) by a vacuum injection method, the open portion is sealed to prepare a liquid crystal cell. Polarizers are disposed before and after the optical path of the liquid crystal cell at cross nicols to form a normally white mode. This is a mode of transmitting a light at passing an electric current.

By laminating the above-described color filter and the above-described TN liquid crystal cell so that the pixels of both members overlap each other, a color display element is prepared.

Then, by selectively passing an electric current to the electrodes of the color filter and the liquid crystal dimming layer, the change of the light transmittance is observed.

In the sample before passing an electric current, the liquid crystal dimming layer is in a light-transmitting state but because the high molecular gel particles of the color filter are in a swelled state, an incident light is mostly absorbed by the swelled gel particles, the amount of the transmitted light is about 10%, and the color of the transmitted light is white. On the other hand, when an electric current is passed to all the pixels of the color filter, the amount of the transmitted light is increased to about 30% (white display). When passing of the electric current is stopped, the amount of the transmitted light is returned to the original amount at about 30 milliseconds. Also, when the electric current is passed to all the pixels of the liquid crystal dimming layer, the liquid crystal dimming layer becomes a non-light- transmitting state, the amount of the transmitted light becomes 0.1% or lower, and the display becomes a black display. Then, when the electric current is passed to all the dimming layer except the regions placed under the R pixels, the transmitted light is changed to a red color. Similarly, when the electric current is passed to the liquid crystal dimming layer except the regions corresponding to the G pixels or the B pixels, the transmitted light can be changed to a green color or a blue color, respectively. Furthermore, by passing the electric current to the liquid crystal dimming layer other than the regions corresponding to color pixels of two colors, a mixed color can be displayed. For example, when the electric current is selectively passed to the liquid crystal dimming layer of the regions corresponding to the B pixels, the display of a yellow color (Y), which is the mixed color of R and G, can be realized. Similarly, by selecting two colors, each color of cyan (C) and magenta (M) can be displayed.

Furthermore, the luminance of a single color can be variously controlled. For example, by passing the electric current to all the pixels except the R pixels of the color filter layer, more bright red than the above-described red display can be displayed. As described above, by passing an electric current by combining the color filter and each pixels of the liquid crystal dimming layer, the colors having various color tones can be displayed.

Also, when a diffusion reflection plate made of MgO is disposed at the background of the color display element, it is confirmed that a bright reflection type display having the reflectance of the white display of at least 25% becomes possible. On the other hand, it is also confirmed that when a back light is disposed, a more bright and clear display can be realized.

As described above, it is confirmed that the color display element of Example 5 can realize the bright and color tone-enriched display.

COMPARATIVE EXAMPLE

A color display element is prepared by combining the TN crystal liquid cell prepared in Example 5 and a general color filter of R, G, and B and the optical characteristics are evaluated.

As the above-described color filter, a substrate having formed thereon striped color filter layers of R, G, and B is used. The striped color filter layers are formed by the layers of each color disposed on a substrate in stripe forms (corresponding to striped electrodes) using a resin containing each of the pigments of R, G, and B by a lithographic method. Furthermore, after forming a protective layer on the striped color filter layers an ITO electrode layer is formed thereon by a sputtering method and the electrode layer is worked to strip forms.

Then, a liquid crystal cell is prepared by the same procedure as Example 5 except that the color filter substrate prepared above is used.

The light transmittance of the color display element before passing an electric current is a white display and but is low as about 8%. On the other hand, when an electric current is passed to all the pixels, the light transmittance becomes a black display of 0.1% or lower.

Also, by passing an electric current to specific pixels only as in Example 5, each of various colors can be displayed. However, in the case of each color, the amount of the transmitted light is very low, and the discrimination of the displayed image is difficult without disposing an intense back light. Also, because the transmitted light of the color filter layers cannot be changed, the brightness (luminance) of the transmitted light cannotbe controlled different from the case of Example 5.

As described above, it is confirmed that the display element of Example 5, which is the display element using the liquid crystal dimming layer, is excellent in the brightness and the variety of the color tones as compared with the display element of the comparative example using the color filter of prior art.

As described above in detail, according to the present invention, a color filter and a display element having a high utilization efficiency of light can be provided. Also, according to the invention, a color filter capable of changing the color tone of the transmitted light can be provided. Furthermore, according to the invention, a display element, a display method and a display device capable of displaying bright images can be provided.

What is claimed is:

1. A color filter, comprising:
   a substrate;
   at least first and second stimulus responsive high molecular gels each having a different color formed on the substrate; and
   a liquid in contact with the at least first and second stimulus responsive high molecular gels,
   wherein the color filter can transmit light of each different color of the at least first and second stimulus responsive high molecular gels, and
   wherein amounts of light transmitted through the at least first and second stimulus responsive high molecular gels, respectively, can be changed to change the color tone of light transmitted by the color filter.

2. The color filter according to claim 1, wherein the color filter comprises first colored regions including the first stimulus responsive high molecular gels, and second colored regions including the second stimulus responsive high molecular gels.

3. The color filter according to claim 2, wherein in the first colored regions and the second colored regions, each of the first and second stimulus responsive high molecular gels is fixed to the surface of the substrate.

4. The color filter according to claim 1, wherein the first and second stimulus responsive high molecular gels change their volumes by adsorbing or releasing the liquid when being imparted by an external stimulus.

5. The color filter according to claim 1, wherein the color filter comprises the stimulus responsive high molecular gels of three primary colors of R (red), G (green), and B (blue).

6. The color filter according to claim 1, wherein the color filter comprises a stimulus imparting unit that imparts a stimulus to the first and second stimulus responsive high molecular gels.

7. The color filter according to claim 6, wherein the stimulus imparting unit includes of partitioned stimulus imparting layers formed on the substrate.

8. A display element comprising:
   a color filter comprising a substrate, at least first and second stimulus responsive high molecular gels each having a different color formed on the substrate, and a liquid in contact with the at least first and second stimulus responsive high molecular gels; and
   a dimming element dimming incident light into the color filter.

9. The display element according to claim 8, wherein the dimming element includes a substrate, black stimulus responsive high molecular gels on the substrate, and a liquid in contact with the stimulus responsive high molecular gels.

10. The display element according to claim 9, wherein the display element includes a stimulus that imparts unit of imparting a stimulus to the black stimulus responsive high molecular gels.

11. The display element according to claim 10, wherein the stimulus imparting unit includes of partitioned stimulus imparting layers formed on the substrate of the dimming element.

12. The display element according to claim 8, wherein the dimming element is a liquid crystal dimming element.

13. The display element according to claim 8, wherein the display element includes a light-irradiating unit that irradiates the dimming element with a light.

14. The display element according to claim 8, wherein the display element includes a light-reflecting unit that reflects a light to the dimming element.

15. The display element according to claim 8, wherein:
   the color filter can simultaneously transmit light of each different color of the at least first and second stimulus responsive high molecular gels;
   amounts of light transmitted through the respective at least first and second stimulus responsive high molecular gels can be changed to change the color tone of light transmitted by the color filter.

16. A display element comprising:
   a substrate;
   a first layer disposed at one surface side of the substrate, the first layer including colored stimulus responsive high molecular gels and a liquid in contact with the colored stimulus responsive high molecular gels; and
   a second layer disposed at another surface side of the substrate, the second layer including black stimulus responsive high molecular gels and a liquid in contact with the black stimulus responsive high molecular gels, wherein
   the first layer includes colored regions having different colors from each other formed by disposing the colored stimulus responsive high molecular gels at partitioned regions, and
   the second layer includes dimming regions formed by disposing the black stimulus responsive high molecular gels at partitioned regions.

17. The display element according to claim 16, wherein:
   the colored stimulus responsive high molecular gels can each transmit light of a different color; and
   amounts of light transmitted through the respective colored stimulus responsive high molecular gels can be changed to change the color tone of the display element.

18. A display device comprising:

a display element comprising a color filter and a dimming element;

a unit that changes a light transmittance of the color filter of the display element according to input image information; and a unit that changes the light transmittance of the dimming element of the display element according to the image information, the display element comprising the color filter and the dimming element dimming an incident light into the color filter, and the color filter comprising a substrate, at least first and second stimulus responsive high molecular gels each having a different color formed on the substrate, and a liquid in contact with the at least first and second stimulus responsive high molecular gels.

19. The display device according to claim 18, wherein the display element comprises:

a substrate;

a first layer disposed at one surface side of the substrate, the first layer includes colored stimulus responsive high molecular gels and a liquid in contact with the colored stimulus responsive high molecular gels; and a second layer disposed at another surface side of the substrate, the second layer includes black stimulus responsive high molecular gels and a liquid in contact with the black stimulus responsive high molecular gels, wherein the first layer includes colored regions having different colors from each other formed by disposing the colored stimulus responsive high molecular gels at partitioned regions, and wherein the second layer includes dimming regions formed by disposing the black stimulus responsive high molecular gels at partitioned regions.

20. The display device according to claim 18, wherein:

the color filter can simultaneously transmit light of each different color of the at least first and second stimulus responsive high molecular gels;

amounts of light transmitted through the respective at least first and second stimulus responsive high molecular gels can be changed to change the color tone of light transmitted by the color filter.

21. A display method using a display element comprising a substrate, a first layer disposed at one surface side of the substrate, the first layer including colored stimulus responsive high molecular gels and a liquid in contact with the stimulus responsive high molecular gels, and a second layer disposed at another surface side of the substrate, the second layer including black stimulus responsive high molecular gels and a liquid in contact with the black stimulus responsive high molecular gels, the method comprising:

changing the light transmittance of the second layer by at least one of (i) imparting a stimulus to the black stimulus responsive high molecular gels and (ii) changing the light transmittance of the first layer by imparting a stimulus to the colored stimulus responsive high molecular gels, to change the color tone of the display color.

22. The display method according to claim 21, further comprising:

simultaneously transmitting light of at least two different colors of the colored stimulus responsive high molecular gels; and changing respective amounts of light transmitted through the colored stimulus responsive high molecular gels to change the color tone of the display color.

* * * * *